US012759383B2

(12) United States Patent
Schreiber et al.

(10) Patent No.: US 12,759,383 B2
(45) Date of Patent: Oct. 13, 2026

(54) TAILGATE PAD

(71) Applicant: Fox Factory, Inc., Duluth, GA (US)

(72) Inventors: Gary Schreiber, Surrey (CA); Jean-Francois Lacroix, North Vancouver (CA); Robbie Roberts, Port Moody (CA); Rodrigo Rebello da Motta, New Westminster (CA); Marco Rota, Carvico (IT)

(73) Assignee: Fox Factory, Inc., Duluth, GA (US)

( * ) Notice: Subject to any disclaimer, the term of this patent is extended or adjusted under 35 U.S.C. 154(b) by 236 days.

(21) Appl. No.: 18/532,660

(22) Filed: Dec. 7, 2023

(65) Prior Publication Data

US 2024/0308315 A1 Sep. 19, 2024

Related U.S. Application Data

(60) Provisional application No. 63/431,293, filed on Dec. 8, 2022, provisional application No. 63/431,292, filed on Dec. 8, 2022, provisional application No. 63/431,291, filed on Dec. 8, 2022, provisional application No. 63/431,296, filed on Dec. 8, 2022.

(51) Int. Cl.
*B60J 11/06* (2006.01)

(52) U.S. Cl.
CPC .................................... *B60J 11/06* (2013.01)

(58) Field of Classification Search
CPC .......... B60J 11/06; B60R 13/01; B60R 19/44; B60R 9/10; B60R 9/06; B60R 2011/0059; B60R 2013/016; B60R 11/00
USPC .......................................................... 280/770
See application file for complete search history.

(56) References Cited

U.S. PATENT DOCUMENTS 3,665,355 A * 5/1972 Sasaki .................. H01F 7/0215 428/102
4,849,272 A * 7/1989 Haney ...................... B25H 5/00 428/102
4,974,892 A * 12/1990 Huard .................... B60Q 5/006 293/128
5,129,695 A * 7/1992 Norman, II .............. B60J 11/06 293/128
5,255,464 A * 10/1993 Marecek ............... G09F 21/048 40/591
5,320,392 A * 6/1994 Hart ........................ B60R 13/04 293/120
5,799,975 A 9/1998 Crick
6,247,742 B1 6/2001 Boudreaux
6,254,170 B1 7/2001 Farmer et al.
6,286,885 B1 9/2001 Ramos
6,484,427 B1 11/2002 Santa Cruz et al.
6,695,556 B2 * 2/2004 Addy ........................ B60R 9/00 410/97

(Continued)

FOREIGN PATENT DOCUMENTS

CA 3222472 A1 6/2024

*Primary Examiner* — James A Shriver, II
*Assistant Examiner* — Hilary L Johns

(57) ABSTRACT

A tailgate pad. The tailgate pad includes a front side, a top side, and a back side. The tailgate pad includes at least one external pad coupled with the back side. The external pad having a deployed position extending from the back side, over the top side, and coupled with an external pad retainer on the front side to provide a padded structure for a portion of a bicycle resting thereon. The external pad having a stowed position that does not traverse the top side.

30 Claims, 17 Drawing Sheets

(56) References Cited

U.S. PATENT DOCUMENTS

| | | | | |
|---|---|---|---|---|
| 6,749,250 | B1 * | 6/2004 | Reid | B60R 13/00 296/57.1 |
| 8,061,761 | B1 * | 11/2011 | Sierra | B60J 11/06 296/136.01 |
| 9,522,767 | B1 * | 12/2016 | Pass | G09F 21/04 |
| 9,701,225 | B1 * | 7/2017 | Hogan | A47C 4/52 |
| 10,300,861 | B1 | 5/2019 | Green et al. | |
| 10,343,617 | B2 * | 7/2019 | Cox | B60R 9/10 |
| 10,377,215 | B2 | 8/2019 | Sierra | |
| 10,696,236 | B1 * | 6/2020 | Starkey | B60P 1/283 |
| 10,807,453 | B2 * | 10/2020 | Brown | B60J 11/06 |
| 10,857,950 | B2 | 12/2020 | Cox | |
| D969,049 | S | 11/2022 | He | |
| 11,491,856 | B2 * | 11/2022 | Low | B60J 11/06 |
| 11,565,631 | B2 * | 1/2023 | Shneyer | E05B 71/00 |
| 11,634,086 | B2 * | 4/2023 | Gu | B60R 9/10 224/403 |
| 11,760,271 | B2 * | 9/2023 | Low | B60R 9/10 296/39.1 |
| 12,043,095 | B2 | 7/2024 | Low et al. | |
| 12,139,105 | B2 | 11/2024 | Low et al. | |
| 2002/0135202 | A1 * | 9/2002 | Rokahr | B62D 33/0273 296/57.1 |
| 2003/0038497 | A1 | 2/2003 | Fitzgerald | |
| 2005/0275241 | A1 * | 12/2005 | Rothwell | B60R 11/00 296/136.01 |
| 2008/0203752 | A1 * | 8/2008 | Warkentin | B62D 33/0273 296/57.1 |
| 2012/0118928 | A1 * | 5/2012 | Laws | B60R 9/06 224/403 |
| 2013/0220185 | A1 * | 8/2013 | Valenta | B65D 65/10 108/90 |
| 2015/0043231 | A1 * | 2/2015 | Clark | F21S 43/00 362/485 |
| 2017/0144614 | A1 * | 5/2017 | DePalma | B60R 13/013 |
| 2019/0160930 | A1 * | 5/2019 | Brown | B60J 11/00 |
| 2019/0337464 | A1 * | 11/2019 | Cox | B60R 9/06 |
| 2019/0344720 | A1 | 11/2019 | Green et al. | |
| 2020/0215957 | A1 * | 7/2020 | Starkey | B62D 33/023 |
| 2020/0331332 | A1 * | 10/2020 | Low | B60J 11/06 |
| 2021/0107416 | A1 | 4/2021 | Stien | |
| 2022/0001808 | A1 * | 1/2022 | Low | B60R 13/01 |
| 2022/0063508 | A1 * | 3/2022 | Shneyer | B60R 9/10 |
| 2022/0339996 | A1 * | 10/2022 | Malina | B60R 19/44 |
| 2022/0379817 | A1 * | 12/2022 | Gu | B60R 9/06 |
| 2023/0059483 | A1 * | 2/2023 | Low | B60J 11/06 |
| 2023/0286363 | A1 | 9/2023 | Madrid | |
| 2024/0001860 | A1 * | 1/2024 | Low | B60R 9/10 |

* cited by examiner

TAILGATE PAD

CROSS-REFERENCE TO RELATED APPLICATIONS

This application claims priority to and benefit of U.S. Provisional Patent Application No. 63/431,291 filed on Dec. 8, 2022, entitled "DISCRETE POSITIONING TAILGATE PAD" by Gary Schreiber, and assigned to the assignee of the present application, the disclosure of which is hereby incorporated by reference in its entirety.

This application also claims priority to and benefit of U.S. Provisional Patent Application No. 63/431,292 filed on Dec. 8, 2022, entitled "CONTINUOUS POSITION TAILGATE PAD" by Jean Francois Lacroix, and assigned to the assignee of the present application, the disclosure of which is hereby incorporated by reference in its entirety.

This application also claims priority to and benefit of U.S. Provisional Patent Application No. 63/431,293 filed on Dec. 8, 2022, entitled "COOPERATIVE BRACKETS APPROACH" by Robbie Roberts et al., and assigned to the assignee of the present application, the disclosure of which is hereby incorporated by reference in its entirety.

This application also claims priority to and benefit of U.S. Provisional Patent Application No. 63/431,296 filed on Dec. 8, 2022, entitled "TAILGATE PAD" by Gary Schreiber et al., and assigned to the assignee of the present application, the disclosure of which is hereby incorporated by reference in its entirety.

FIELD OF THE INVENTION

Embodiments of the present technology relate generally to a tailgate pad.

BACKGROUND

Many trucks and other vehicles include a tailgate. In some instances, owners of tailgate-equipped vehicles will utilize the tailgate when transporting, for example, a bicycle. For example, a truck owner will position a bicycle in the bed of the truck such that the front fork of the bicycle straddles the tailgate. In so doing, the front fork of the bicycle is located outside of the bed of the truck, while the rest of the bicycle is located inside of the bed of the truck. In such a position, the tailgate is disposed between the front fork and the rest of the bicycle frame, and, as a result, the tailgate supports the bicycle in an upright position. Hence, the tailgate can be used in lieu of, or in addition to, various bicycle carrier devices (e.g., bike racks). To prevent damage to the tailgate, and/or a bicycle straddling the tailgate, protective tailgate pads may be attached to the tailgate.

At present, there are significant variations in the structure and features of tailgates across various vehicle makers. Further, there are even significant variations in the structure and features of tailgates across vehicles from the same vehicle maker. As a result, in order to select an appropriate tailgate pad, a consumer is required to select a tailgate pad specifically designed to match the particular tailgate structure and the particular features of that consumer's vehicle.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

As stated above, in some instances, owners of tailgate-equipped vehicles may utilize the tailgate when transporting, for example, a bicycle, a surfboard, a motorcycle, lumber, and the like that are transported in the bed of a truck. For purposes of brevity and clarity, the following discussion will refer to the tailgate of a truck. It should be understood, however, that the present embodiments are also well suited to use with a tailgate of a vehicle other than a truck. However, for purposes of brevity and clarity, and not to be interpreted as a limitation, the following discussion will describe embodiments of the present invention while referring to a truck tailgate being used to support a bicycle.

Figure 1:
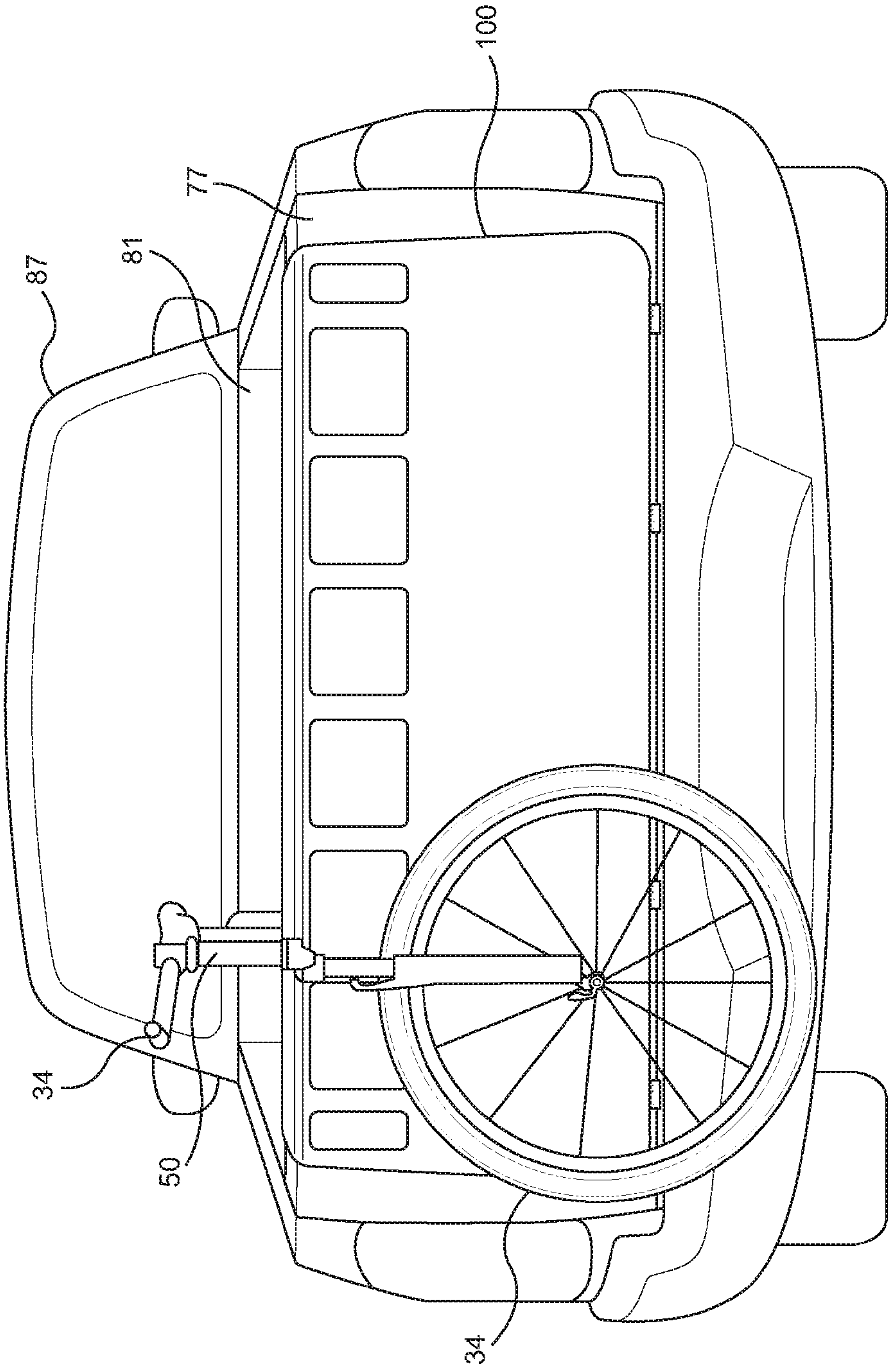
FIG. 1 is a perspective view of a tailgate pad disposed about a tailgate of a vehicle and a bicycle disposed about the tailgate pad, in accordance with an embodiment.

FIG. 1 is a perspective view of a discrete positioning tailgate pad 100 disposed about a tailgate 77 of a vehicle 81 and a bicycle 50 disposed about the discrete positioning tailgate pad 100 in accordance with an embodiment. In one embodiment, the vehicle 81 is a truck.

In the following discussion, the term tonneau refers to an area of a vehicle (such as a car, truck, side-by-side, etc.) the is open at the top. In general, a tonneau can be used for cargo or passengers. A simple example of a tonneau is a bed 87 of a truck, such as a pick-up truck. Although a pick-up truck is disclosed, a tonneau is also found in other vehicles to include a Ute, e.g., a vehicle built on passenger car chassis and with the tonneau integrated with the passenger body. Another example of a vehicle with a tonneau is a side-by-side (golf-cart, maintenance vehicle, etc.) that has a somewhat open seating area at the front and then the tonneau area there behind.

The tonneau is often enclosed on three sides by fixed structures and the fourth side is enclosed with a movable structure. For example, in a pick-up truck, a front structure encloses the front of the tonneau located by the cab of the truck and the two sidewalls are fixedly coupled with the front enclosure. A moveable tailgate 77 is coupled with the two sidewalls and is used to provide access to the tonneau and also act as a fourth sidewall to keep any contents placed within the tonneau from falling out of the tonneau. The tailgate 77 is usually attached at the bottom of the sidewalls by a hinge (or the like) and when open lays flat to act as an access point and also as an extension to the cargo area of the tonneau. When closed, the tailgate 77 is usually lifted up e.g., rotated about the hinge, till it reaches an engagement or latch portion of the sidewall. Once the tailgate 77 is latched to the sidewalls, it is held in an upright closed position forming the fourth wall about the tonneau. Normally, there is a handle or the like that is used to disengage the latch and allow the tailgate 77 to be rotated back downward to an open position.

Although there are a number of different tonneau configured vehicles, for purposes of clarity, the tonneau will be referred to hereinafter as a bed 87. Moreover, for purposes of clarity, the tailgate-equipped truck bed will refer to the tailgate 77 of the truck as shown in FIG. 1.

The discrete positioning tailgate pad 100 is useful in securing the bicycle 50 within a truck bed 87 and preventing the bike/s from getting damaged or damaging the truck. This is achieved by placing the bicycle 50 such that the handlebars 38 and front wheel 34 extend over the tailgate 77, with the wheel turned left or right to keep it from extending too far out, and the rear wheel resting in the bed 87. The down tube is then strapped down to secure the bike in an upright position.

As shown in further detail herein, the down tube is the portion of the bicycle 50 extending from the head tube to the bottom bracket, and a down tube strap is coupled with the tailgate pad and straps around the down tube to hold the bike against the discrete positioning tailgate pad 100 and thus the tailgate 77.

In one embodiment, a bicycle 50 is being used as the item within the bed 87 and resting on the discrete positioning tailgate pad 100. However, in another embodiment, discrete positioning tailgate pad 100 is well suited for use with other items such as, for example, a surfboard, a paddleboard, lumber or other items which may be transported in the bed of a truck and may rest partially on the tailgate 77 thereof. That said, for purposes of clarity, and not to be interpreted as a limitation, the following discussion will describe embodiments of the present invention while referring to a truck tailgate 77 being used to support a bicycle 50.

Figure 2B:
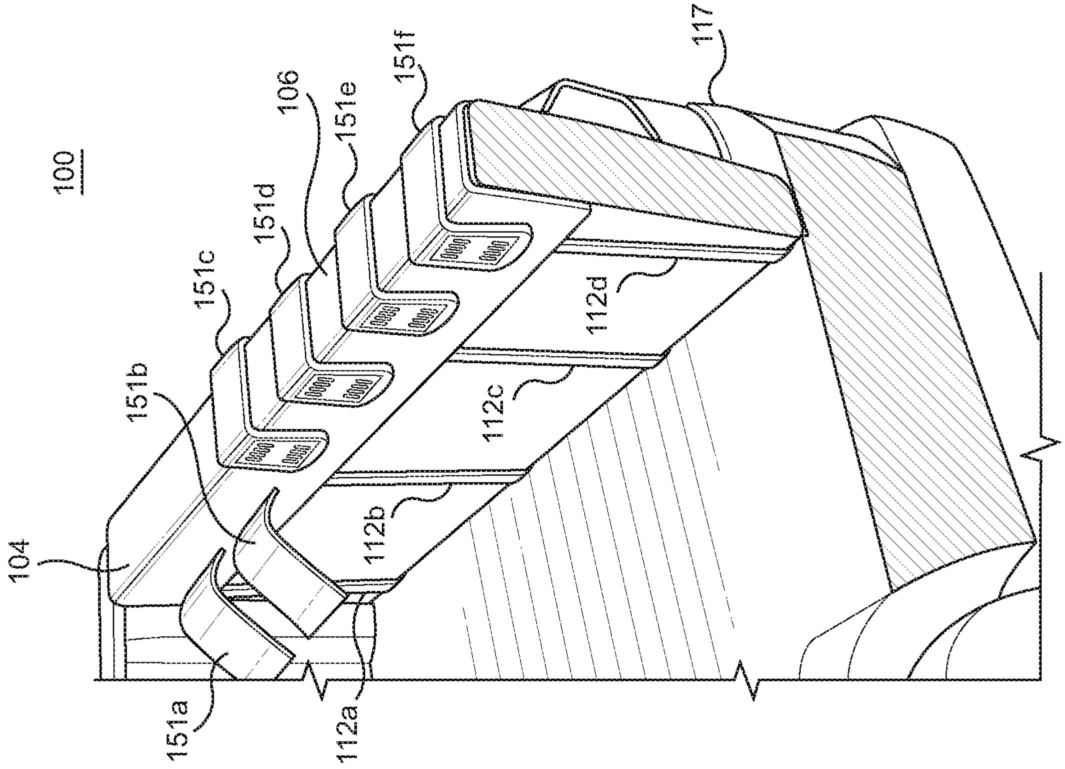
FIG. 2B is an off-center side perspective view of the discrete positioning tailgate pad, in accordance with an embodiment.
Figure 2A:
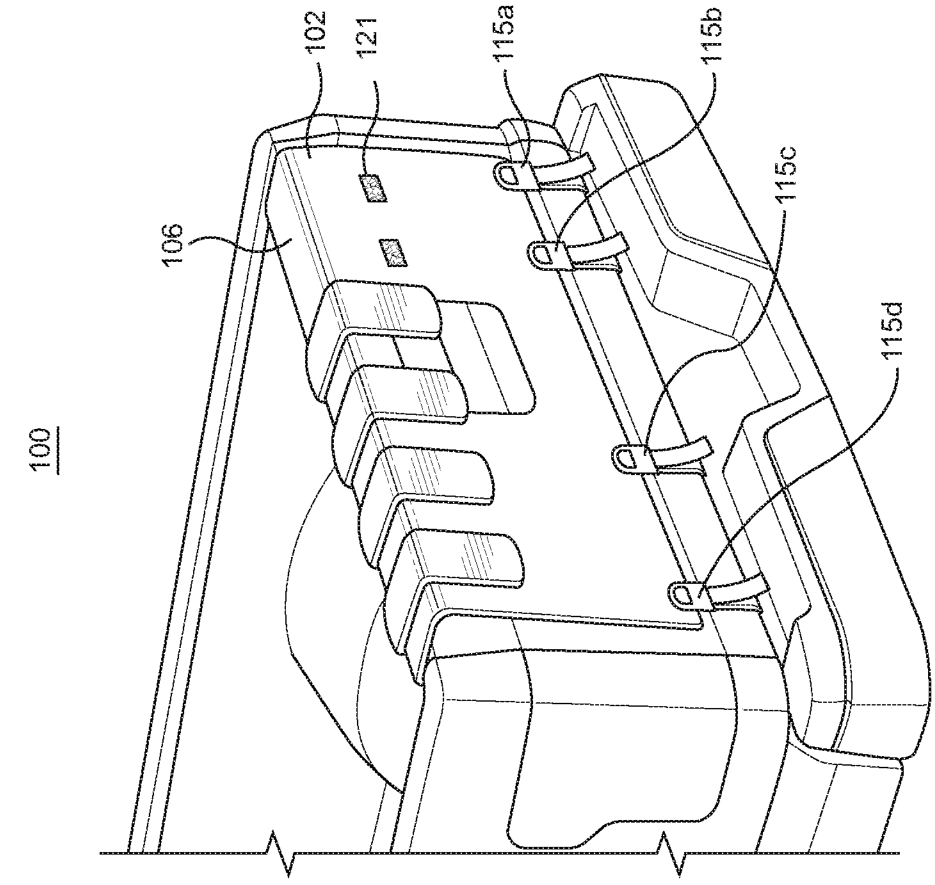
FIG. 2A is a front perspective view of a discrete positioning tailgate pad, in accordance with one embodiment.

Referring now to FIG. 2A, a front perspective view of a discrete positioning tailgate pad 100 is shown in accordance with one embodiment. FIG. 2B is an off-center side perspective view of the discrete positioning tailgate pad 100 shown in accordance with an embodiment. With reference now to FIGS. 2A and 2B, discrete positioning tailgate pad 100 includes a front side 102, a top side 106, and a back side 104.

In one embodiment, one, some, or all of front side 102, back side 104 and top side 106 include a tailgate-facing surface and an exterior-facing surface. In one embodiment, at least a portion of -one, each or every tailgate-facing surface of front side 102, back side 104, and top side 106 of discrete positioning tailgate pad 100 include a paint protecting material to protect the painted surface of tailgate 77. In one embodiment, the paint protecting material on the inner or tailgate-facing surface is a material such as, but not limited to, a fleece lining, microfiber lining, flannel lining, a synthetic and/or natural textile lining, a non-woven textile, polymer foams, and the like.

In one embodiment, only a tailgate-facing surface of front side 102, back side 104, and top side 106 of discrete positioning tailgate pad 100 that is abutted against a painted surface of tailgate 77 includes a soft material that is configured so as to not damage the painted surface of tailgate 77. In one embodiment, at least a portion of the other tailgate-facing surfaces of discrete positioning tailgate pad 100 that are not abutted against a painted surface of tailgate 77 (e.g., such as the top and the interior of tailgate 77 one or both of which may include a hard protective cover or be coated with a protective material such as a spray on bed liner) include a more durable material such as nylon, polyamide (PA), rayon (e.g., Cordura), denim, a stretched polytetrafluoroethylene (PTFE) (e.g., Gor-Tex), an aramid (e.g., Kevlar, Nomex, Technora, and the like), a thermoplastic polymer, polyester, polyvinyl chloride (PVC), Chlorosulfonated Polyethylene Rubber (CSM), silicone, and the like.

In one embodiment, one, each or every exterior-facing surface of front side 102, back side 104, and top side 106 of discrete positioning tailgate pad 100 includes a durable material such as nylon, PA, rayon, denim, a stretched PTFE, an aramid, a thermoplastic polymer, and the like.

In one embodiment, there is no padding between the interior and exterior-facing surfaces of one or more sections of discrete positioning tailgate pad 100. For example, as shown and for the purposes described in further detail herein, in one embodiment, there is no padding between the interior and exterior-facing surfaces on the top side 106 of discrete positioning tailgate pad 100.

In one embodiment, discrete positioning tailgate pad 100 includes padding or other features, disposed between the exterior-facing surface and the tailgate-facing surface of front side 102 and/or back side 104. In one embodiment, the padding or other features are multiple layers of padding. In general, the padding helps to prevent damage to the tailgate 77 and/or the bicycle 50 by providing cushioning between the surfaces of the tailgate 77 and the bicycle 50.

In one embodiment, a lining is disposed on at least some portion of the tailgate-facing surface of front side 102, back side 104, and/or top side 106. The lining provides a desired interface between the tailgate and the one or more tailgate-facing surfaces of discrete positioning tailgate pad 100 to include a scratch reducing interface, a gripping or adhering interface, a low friction interface, and the like.

In one embodiment, a lining is disposed on at least some portion of the exterior-facing surface of front side 102, back side 104, and/or top side 106. The lining provides a desired interface between the discrete positioning tailgate pad 100 and bicycle 50, to include a scratch reducing interface, a gripping or adhering interface, a low friction interface, and the like.

Discrete positioning tailgate pad 100 also includes straps 112*a*-112*d* and strap receiving features 115*a*-115*d* coupled therewith. Straps 112*a*-112*d* are used in conjunction with strap receiving features 115*a*-115*d* to position and secure discrete positioning tailgate pad 100 with tailgate 77.

In one embodiment, straps 112*a*-112*d* are coupled with the back side 104 of discrete positioning tailgate pad 100. Although four straps 112*a*-112*d* are shown to illustrate one embodiment, in another embodiment, discrete positioning tailgate pad 100 will have more or fewer than four straps. Additionally, in some embodiments, the location and/or the spacing between the plurality of straps 112*a*-112*d* will differ from the location and/or spacing of straps 112*a*-112*d* of FIG. 2B. Straps may be, but are not limited to, nylon, tubular material (e.g., ½ inch tubular nylon, 1 inch tubular nylon, etc.), or other strapping that is thin enough to fit between the tailgate 77 and the bed 87 of the vehicle 81.

In one embodiment, strap receiving features 115*a*-115*d* are coupled with the front side 102 of discrete positioning tailgate pad 100. Although four strap receiving features 115*a*-115*d* are shown to illustrate one embodiment, in another embodiment, discrete positioning tailgate pad 100 will have more or fewer than four strap receiving features. Additionally, in some embodiments, the location and/or the spacing between the plurality of strap receiving features 115*a*-115*d* will differ from the location and/or spacing of strap receiving features 115*a*-115*d* of FIG. 2A. Strap receiving feature may be one, some, or a combination of components such as, but not limited to, a cinch ring, a buckle, a clip, a hook-and-loop fastener, a hook and eye fastener, a snap fastener, a magnetic fastener, a zipper, and the like.

In one embodiment, straps 112*a*-112*d* are coupled with the back side 104 of discrete positioning tailgate pad 100 and extend from the back side 104 under the bottom portion of tailgate 77 (as indicated by arrow 117) where they are coupled with strap receiving features 115*a*-115*d*.

In another embodiment, straps 112*a*-112*d* are coupled with the front side 102 of discrete positioning tailgate pad 100 and strap receiving features 115*a*-115*d* are coupled with the back side 104 of discrete positioning tailgate pad 100. In one installation embodiment, straps 112*a*-112*d* are routed from the front side 102, under the bottom portion of tailgate 77, and coupled with strap receiving features 115*a*-115*d* at back side 104 of discrete positioning tailgate pad 100 (e.g., within the truck bed 87). In another embodiment, the discrete positioning tailgate pad 100 will have a combination of front side and back side straps 112*a*-112*d* and associated strap receiving features 115*a*-115*d*.

Discrete positioning tailgate pad 100 also includes one or more external pads 151*a*-151*f* and one or more external pad retainers 121 coupled therewith.

External pads 151*a*-151*f* are coupled to the back side 104 of discrete positioning tailgate pad 100. In one embodiment, the external pads 151*a*-151*f* are fixedly coupled with the back side 104 such as via stitching, glue, or the like. In one embodiment, the external pads 151*a*-151*f* are removably coupled with the back side 104 via an attachment method such as, but not limited to, a clip, a hook-and-loop fastener, a hook and eye fastener, a snap fastener, a magnetic fastener, a zipper, and the like.

External pads 151*a*-151*f* are used to provide padding under the down tube and/or fork of a bicycle 50. In one embodiment, the external pads 151*a*-151*f* include an internal piece of padding (e.g., foam, etc.) within a covering material. In one embodiment, the covering material is one or a combination of the durable materials described herein. In one embodiment, the covering material is the same as the material used for the exterior layer of the discrete positioning tailgate pad 100 to which it is attached. In one embodiment, the covering material is a different material than that used for the exterior layer of the discrete positioning tailgate pad 100 to which it is attached.

External pad retainers 121 are coupled with the front side 102 of discrete positioning tailgate pad 100. In one embodiment, the external pad retainers 121 are fixedly coupled with the front side 102 via an attachment method such as, stitching, glue, or the like. In one embodiment, the external pad retainers 121 are used to removably couple a portion of the external pad to the front side 102. In one embodiment, the external pad retainers 121 include a clip, a hook-and-loop fastener, a hook and eye fastener, a snap fastener, a magnetic fastener, a zipper, and the like to removably couple with the external pad.

In general, there are the same number of external pad retainers 121 as there are external pads 151*a*-151*f*.

Figure 2D:
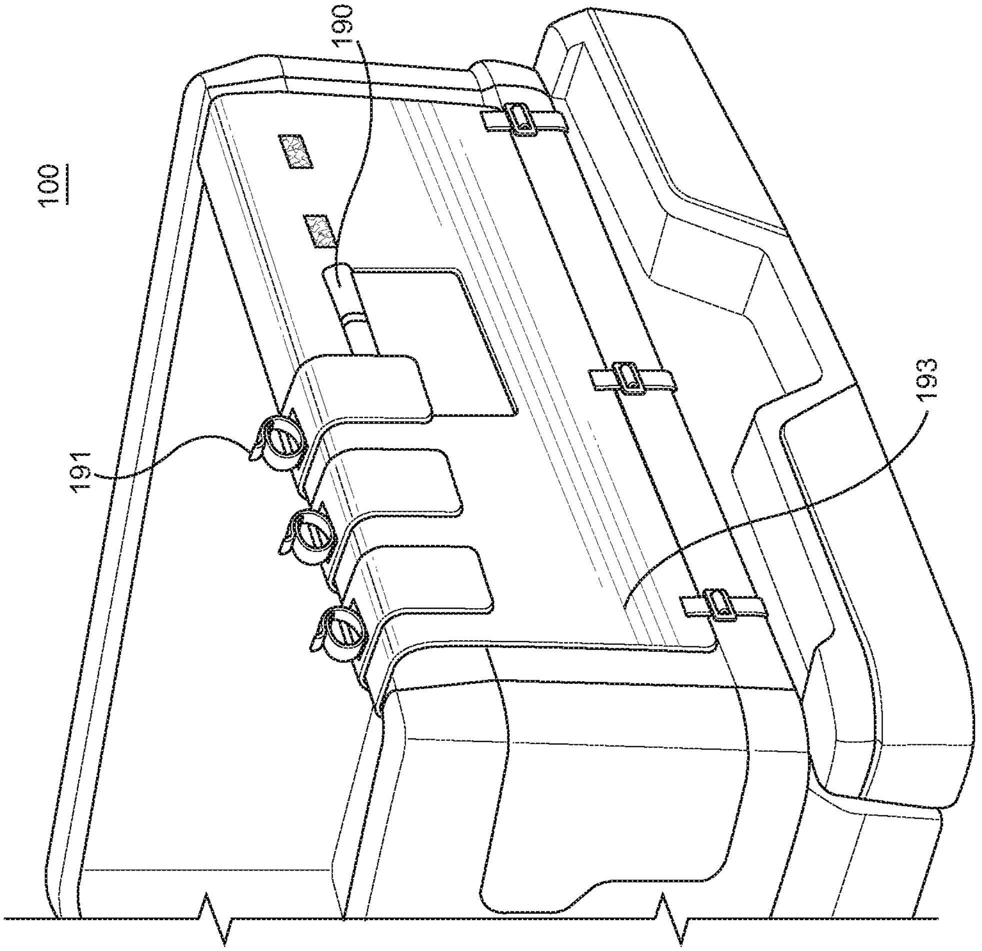
FIG. 2D is a front perspective view of the discrete positioning tailgate pad, in accordance with an embodiment.
Figure 2C:
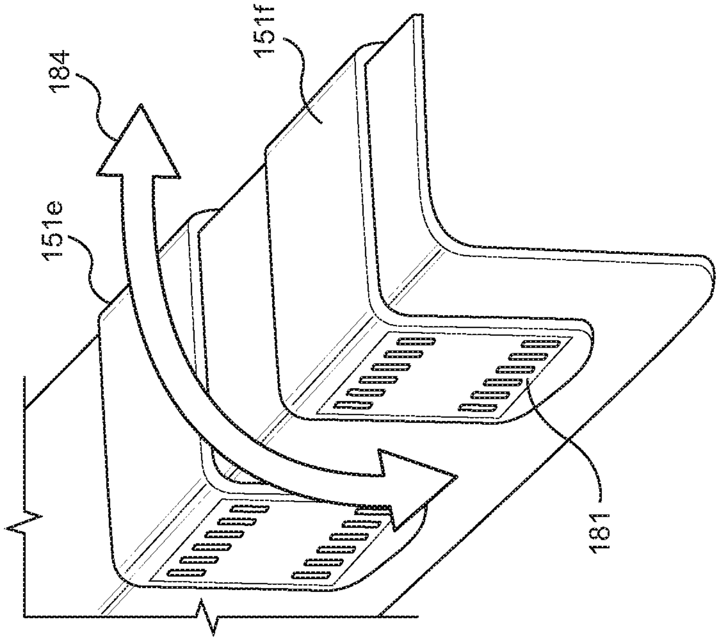
FIG. 2C is an off-center side perspective view of the external pads of discrete positioning tailgate pad, in accordance with an embodiment.

With reference now to FIG. 2C, an off-center side perspective view of external pads 151*e* and 151*f* of discrete positioning tailgate pad 100 is shown in accordance with an embodiment. The external pads include a plurality of slats 181. In general slats 181 are formed through at least a portion of the covering material and provide an attachment point for down tube straps 191 (of FIG. 2D). The slats 181 may be evenly spaced or have variable spacing.

The plurality of slats 181 are provided in each external pad to accommodate for different thicknesses of down tubes. For example, a road bike will have a thinner down tube than an offroad bike, which in turn will have a different sized down tube than an E bike. Accounting for different thicknesses of down tubes is important, as inappropriately sized securement can lead to the bicycle 50 not being held in a stable configuration. For example, if a wide down tube is strapped into an arrangement that is too thin, the bike may end up pivoting and becoming damaged. Similarly, if the securement is too wide for the down tube, the bike may pivot or jostle in a way that could damage the bike or truck.

In one embodiment, by utilizing different inlet and outlet slats 181 when running the down tube strap 191 therethrough, the width of the down tube strap is adjustable to correspond with the thickness of the down tube on the bicycle 50 being secured.

With reference now to FIG. 2A-2C, when positioned for use, one or more of the external pads 151*e* and 151*f* extend from the back side 104, over the top side 106, and attach to the external pad retainer on the front side 102 of discrete positioning tailgate pad 100 as shown by arrow 184.

In contrast, when one or more of external pads 151*a*-151*f* are not in use they can be stowed, e.g., folded, retained, strapped, or the like, at the back side 104 of discrete positioning tailgate pad 100 such that they do not extend over the top side 106 (as shown by external pads 151*a* and 151*b*).

Although six external pads 151*a*-151*f* are shown in one embodiment, in various embodiments, discrete positioning tailgate pad 100 will have more or less than six external pads. Additionally, in some embodiments, the location and/or the spacing of the external pads 151*a*-151*f* will differ from the location and/or spacing of external pads 151*a*-151*f* as depicted in FIGS. 2A-2B.

In one embodiment, there may be a different number of external pads 151*a*-151*f* depending on the size of the discrete positioning tailgate pad 100, e.g., covering the whole tailgate 77, only a portion of the tailgate 77, different sized tailgates, etc. Similarly, there may be a different number of external pads 151*a*-151*f* depending upon the use case, application, or the like.

For example, a discrete positioning tailgate pad 100 would cover the whole tailgate 77 but have only one or a couple of external pads 151*a*-151*f* on part of the discrete positioning tailgate pad 100 while leaving the remainder of the discrete positioning tailgate pad 100 set up for a surfboard, kayak, lumber, or the like.

Referring now to FIG. 2D, a front perspective view of the discrete positioning tailgate pad 100 is shown in accordance with one embodiment. In one embodiment, discrete positioning tailgate pad 100 includes an opening 190 formed in front side 102. In one embodiment, opening 190 will expose and/or provide access to a tailgate handle, a tailgate-mounted backup camera, or other tailgate features. In one embodiment, opening 190 is rectangular in shape and approximately centered about the length of front side 102. Although such a location of opening 190 is shown in FIG. 2D, in another embodiment, discrete positioning tailgate pad 100 will have an opening 190 disposed in front side 102 at a location other than as depicted in FIG. 2D. Further, in one embodiment, opening 190 will have a non-rectangular shape. In one embodiment, discrete positioning tailgate pad 100 includes a cover for opening 190 that may be rolled up (or otherwise moved and/or secured in an open position). In one embodiment, discrete positioning tailgate pad 100 does not include a cover for opening 190.

To maintain the location of the bicycle, a down tube strap 191 is coupled with each of the external pads 151*a*-151*f*. In one embodiment, down tube strap 191 is a nylon strap. In another embodiment, down tube strap 191 is made from another material, or combination of materials, such as plastic, rubber, synthetic, or the like. In one embodiment, down tube strap 191 is made from a dynamic material, e.g., it includes an amount of stretch/flex within the properties of the material. In one embodiment, down tube strap 191 is made from a static material, e.g., the properties of the material are not prone to flexing or stretching.

In one embodiment, the plurality of slats 181 (shown in detail in FIG. 2C and used to retain down tube strap 191) are located close to the location on the back side 104 where the external pads 151*a*-151*f* are coupled (such as shown in FIGS. 2B and 2C).

In one embodiment, the discrete positioning tailgate pad 100 is positioned with respect to tailgate 77 such that one or more of slats 181 are located on the top side of the tailgate 77 (such as shown in FIG. 2D). In another embodiment, the discrete positioning tailgate pad 100 is positioned with respect to tailgate 77 such that one or more of slats 181 are located on one or more of the back side, top side, and/or front side of tailgate 77. The different positioning of discrete positioning tailgate pad 100 with respect to tailgate 77 provides different securing locations for different bicycle 50 down tube configurations.

In one embodiment, discrete positioning tailgate pad 100 includes at least one security component 193. In one embodiment, security component 193 is a grommet. In one embodiment, security component 193 allows a device such as an anti-theft lock, or the like, to secure the discrete positioning tailgate pad 100 to the vehicle 81. For example, a cable is passed through security component 193 of discrete positioning tailgate pad 100, through an eye hook or the like within the bed 87, and then locked together to thwart an illegal attempt at the removal or taking of the discrete positioning tailgate pad 100.

Figure 3B:
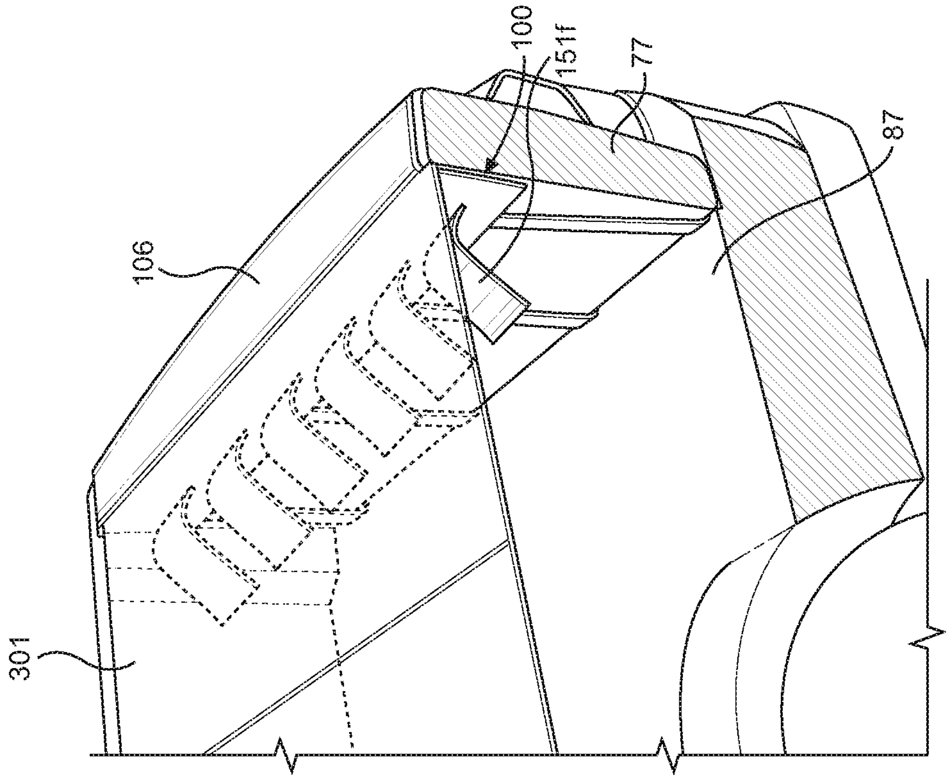
FIG. 3B is a back side perspective view of a vehicle with the discrete positioning tailgate pad installed and a closed bed cover, in accordance with one embodiment.
Figure 3A:
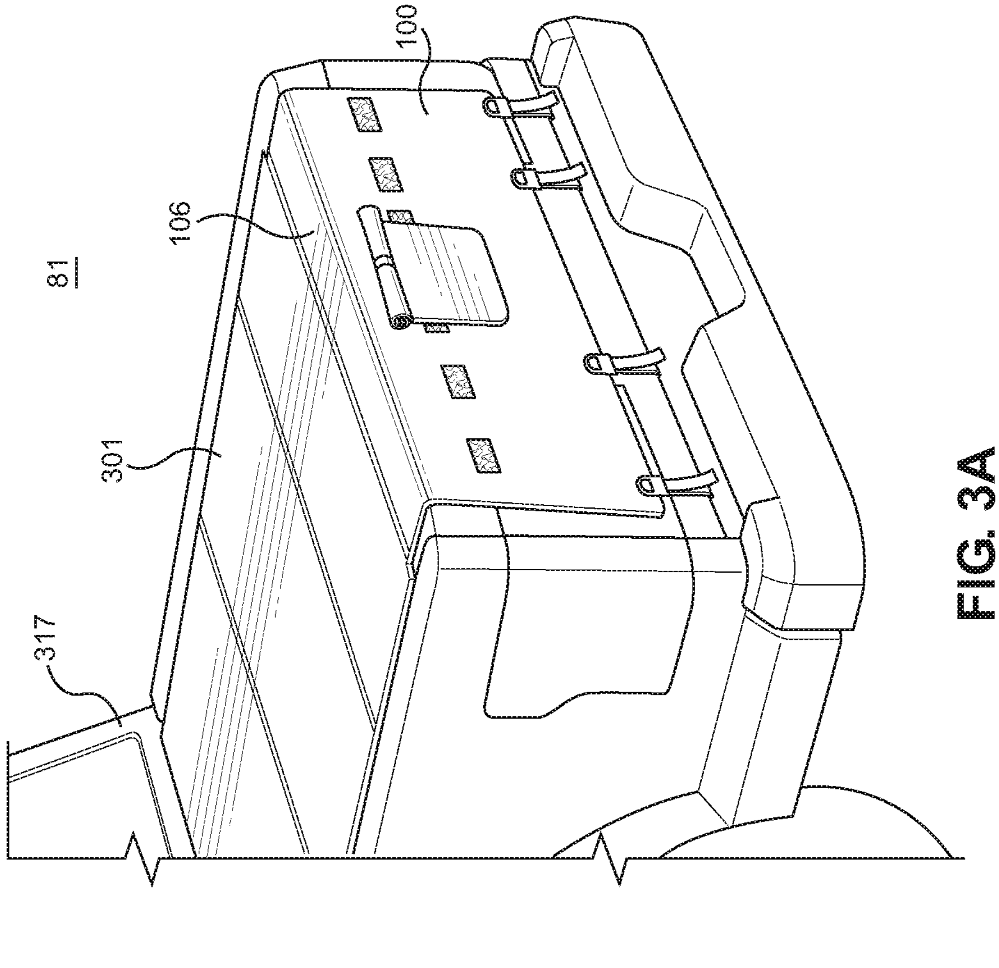
FIG. 3A is a front side perspective view of a vehicle with the discrete positioning tailgate pad installed and a closed bed cover, in accordance with one embodiment.

With reference now to FIG. 3A, a front side perspective view of a vehicle 81 with the discrete positioning tailgate pad 100 installed and a closed bed cover 301 is shown in accordance with one embodiment. FIG. 3B is a back side perspective view of vehicle 81 with the discrete positioning tailgate pad 100 installed and a closed bed cover 301 shown in accordance with one embodiment.

Referring now to both FIGS. 3A and 3B, the bed cover 301 (or tonneau cover) allows the bed 87 to be enclosed. When the bed cover 301 is closed, the bed 87 (and anything therein) will be protected from wind, weather, falling out of the bed, out of sight, and the like. Bed cover 301 can be made of a canopy type material that provides basic weather protection and/or can include metals or other materials and structures to impede and/or stop attempts at cutting the cover.

Bed cover 301 is often foldable, rollable, or the like, such that it can be moved out of the way when the bed 87 is being used to hold larger objects, such as bicycle 50 of FIG. 1. To provide proper fit and weather protection, once properly positioned, bed cover 301 is coupled with the front structure 317 of the bed 87 (located by the cab of the vehicle 81) with bolts, screws, clamps, or the like. Once it is installed, the bed cover 301 can be stowed (to provide access to bed 87 or deployed to cover bed 87.

When stowed, the bed cover 301 is rolled or folded toward the front structure 317. When deployed or extended, the bed cover 301 will fit flush along the two sidewalls of bed 87 and lock into place therewith to provide proper fit and weather protection. The tailgate 77 is operable while bed cover 301 is stowed or extended. However, when the bed cover 301 is extended, the end of bed cover 301 will be flush with the top of tailgate 77 to provide the fourth sidewall and the final weather seal.

Since the bed cover 301 is designed to fit flush with the top of tailgate 77, padding or the like added to the top of tailgate 77 will directly impact the ability of the bed cover 301 to properly close. However, by providing reduced (or no) padding along the top side 106 of discrete positioning tailgate pad 100 and by allowing the external pads 151*a*-151*f* to be stowed on the back side 104 (e.g., within the bed 87), the bed cover 301 can be properly closed while the discrete positioning tailgate pad 100 remains installed on tailgate 77.

In one embodiment, by providing reduced (or no) padding along the top side 106 of discrete positioning tailgate pad 100 and by allowing the external pads 151*a*-151*f* to be stowed on the back side 104 (e.g., within the bed 87), other truck bed accessories such as a camper shell, and the like are also able to be properly installed and utilized while the discrete positioning tailgate pad 100 is installed on tailgate 77.

Thus, the utilization of external pads 151*a*-151*f* in the discrete positioning tailgate pad 100 provides a truck bed accessory compatible solution that is also lightweight and portable.

Figure 4B:
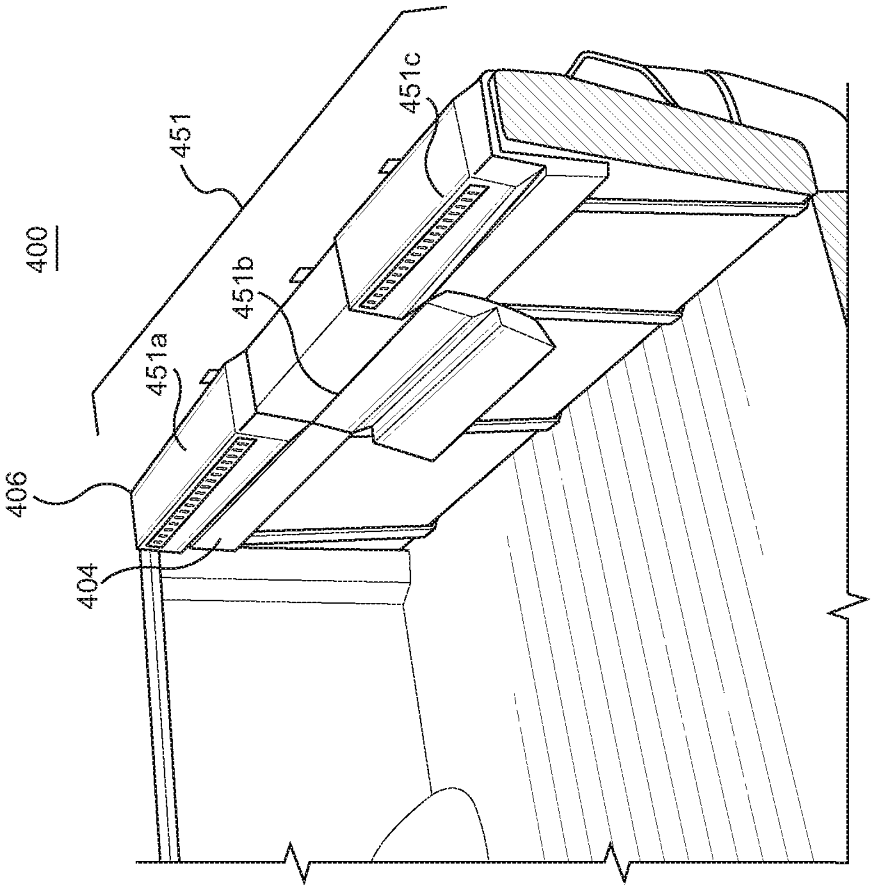
FIG. 4B is an off-center side perspective view of the top and rear of the continuous position tailgate pad, in accordance with an embodiment.
Figure 4A:
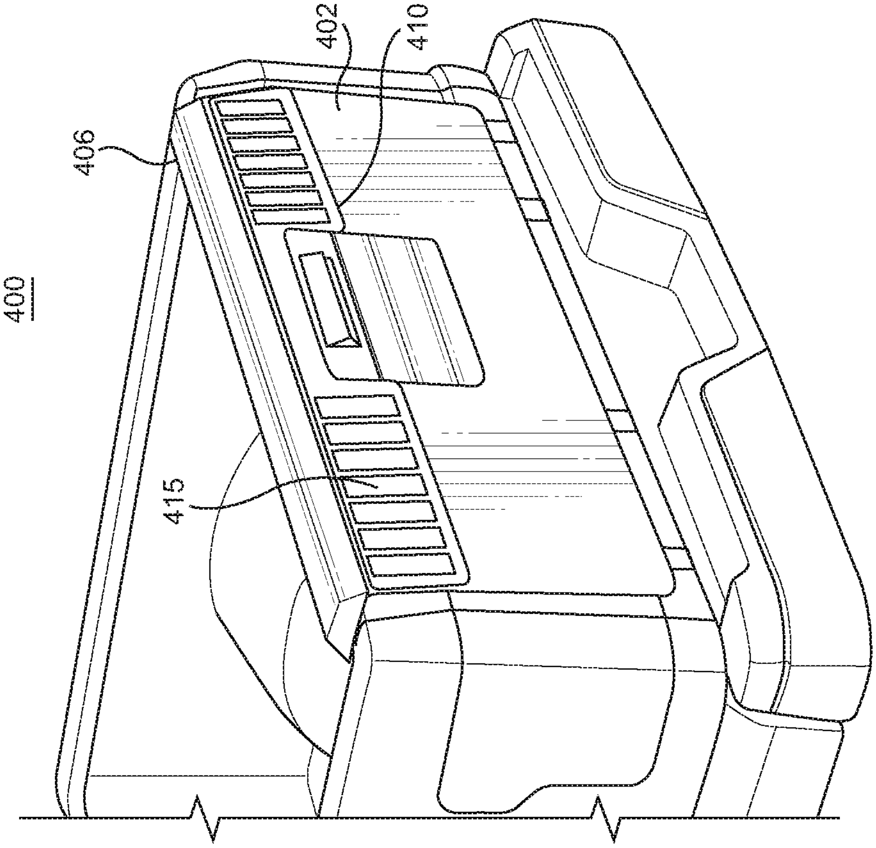
FIG. 4A is a front perspective view of a continuous position tailgate pad, in accordance with one embodiment.

With reference now to FIG. 4A, a front perspective view of a continuous position tailgate pad 400 is shown in accordance with one embodiment. FIG. 4B is an off-center side perspective view of the top and rear of the continuous position tailgate pad 400 shown in accordance with an embodiment.

With reference now to FIGS. 4A and 4B, continuous position tailgate pad 400 includes a front side 402, a top side 406, and a back side 404. In one embodiment, one, some, or all of front side 402, a back side 404 and a top side 406 include a tailgate-facing surface and an exterior-facing surface. In the following discussion, the description of the components of FIGS. 4A and 4B that are similar to those described in FIGS. 1-3B may not be repeated for purposes of clarity but are incorporated herein by reference in their entirety.

Continuous position tailgate pad 400 includes fork retention pads 415. In one embodiment, fork retention pads 415 are compression molded foam. Fork retention pads 415 are used as pads for the fork of a bicycle 50 and to help maintain the position of the bicycle 50 when loaded onto the continuous position tailgate pad 400.

In one embodiment, continuous position tailgate pad 400 has an adjustable range 410 to adjust the coverage size of front side 402. The adjustable range 410 is discussed in further detail with respect to FIGS. 7A and 7B herein.

Continuous position tailgate pad 400 includes external pad 451. In one embodiment, external pad 451 is fixedly coupled with the back side 404 such as via stitching, glue, or the like. In one embodiment, external pad 451 is removably coupled with the back side 404 via an attachment method such as, but not limited to, a clip, a hook-and-loop fastener, a hook and eye fastener, a snap fastener, a magnetic fastener, a zipper, and the like.

In one embodiment, external pad 451 is a single continuous pad. In another embodiment, external pad 451 includes a number of sections such as external pad sections 451*a*-451*c*. Although three sections are shown, in another embodiment, external pad 451 would be divided into more or fewer than three sections.

In one embodiment, the materials, operation, and performance of external pad 451 is similar to those of external pads 151*a*-151*f* and as such, are not repeated for purposes of clarity, but are instead incorporated by reference in their entirety. For example, similar to external pads 151*a*-151*f*, external pad 451 is used to provide padding under the down tube and/or fork of a bicycle 50 when deployed (as shown by external pad sections 451*a* and 451*c*) and removes the external padding from top side 106 when in its stowed configuration (as shown by external pad section 451*b*).

In contrast to external pads 151*a*-151*f* that provided discrete positioning capabilities and characteristics, external pad 451 provides a continuous position characteristics that allow a user to place various bicycles with various diameters anywhere within the bed, while also appropriately restraining the bicycles.

In one embodiment, the covering material of external pad 451 is one or a combination of the durable materials described herein. In one embodiment, the covering material of external pad 451 is the same as the material used for the exterior layer of the continuous position tailgate pad 400 to which it is attached. In one embodiment, the covering material of external pad 451 is a different material than that used for the exterior layer of the continuous position tailgate pad 400 to which it is attached.

Figure 4C:
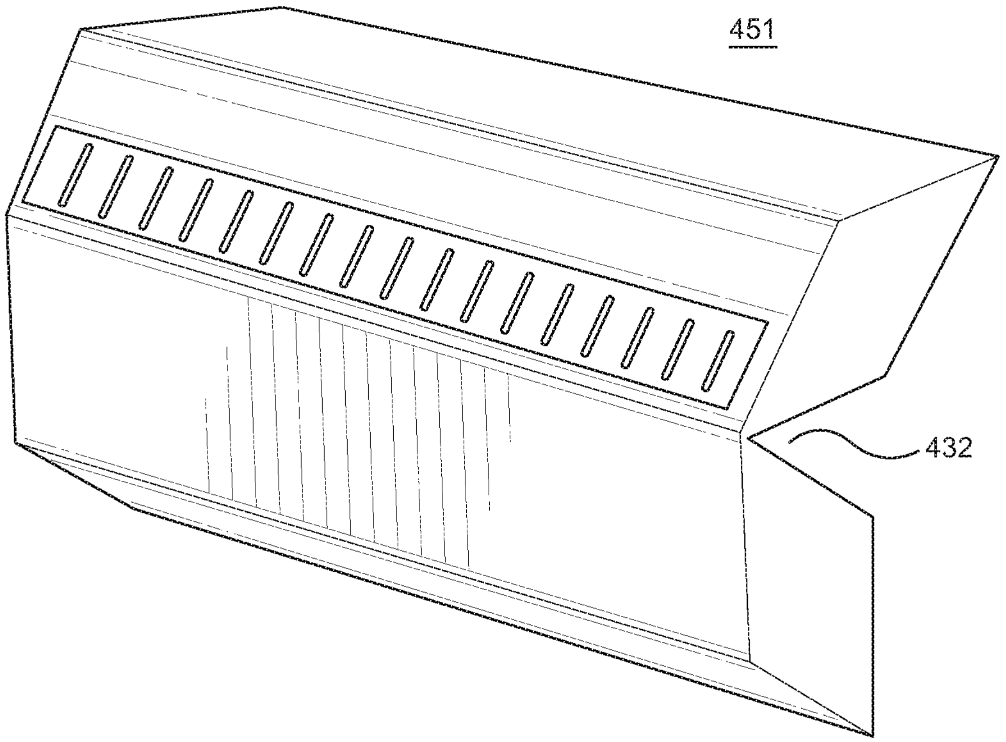
FIG. 4C is an off-center side perspective view of the external pad of continuous position tailgate pad in an open position, in accordance with an embodiment.
Figure 4D:
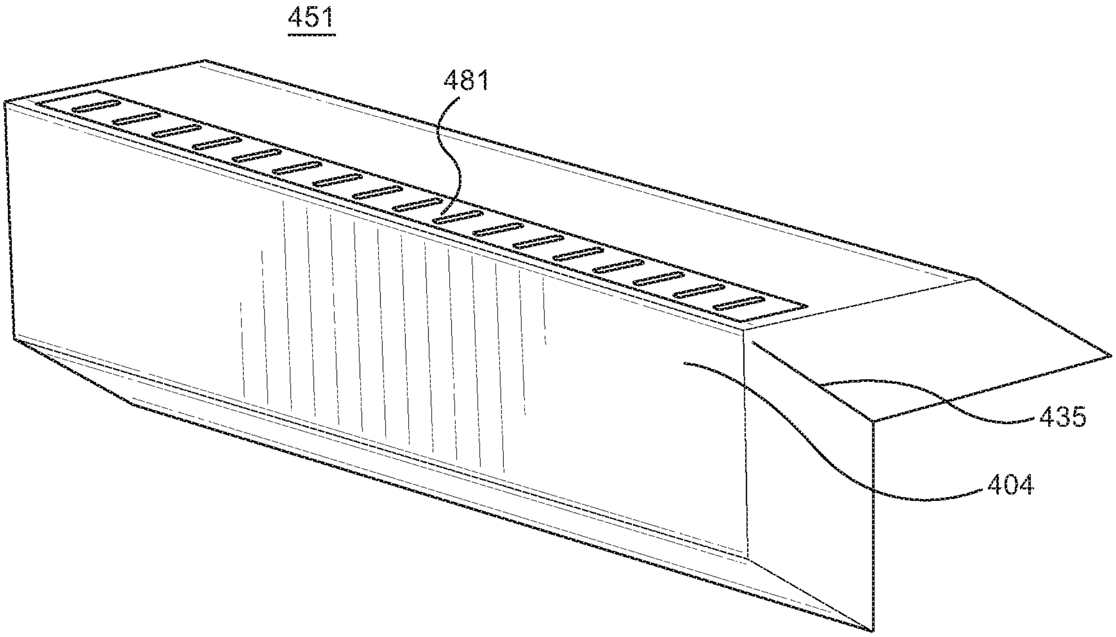
FIG. 4D is an off-center side perspective view of the external pad of continuous position tailgate pad in a deployed position, in accordance with an embodiment.

With reference now to FIG. 4C, an off-center side perspective view of external pad 451 (or a section of external pad 451) of continuous position tailgate pad 400 in an open position is shown in accordance with an embodiment. FIG. 4D is an off-center side perspective view of external pad 451 (or a section of external pad 451) of continuous position tailgate pad 400 in a deployed position (or covering top side 406) is shown in accordance with an embodiment.

In one embodiment, continuous position tailgate pad 400 is made of multiple pieces of durable fabric that are sewn together. In one embodiment, continuous position tailgate pad 400 is made of a single sheet of durable fabric that is sewn to take the desired form. In one embodiment, continuous position tailgate pad 400 comes in at least two sections. In one embodiment, the at least two section make shipping and storing the continuous position tailgate pad 400 easier, as well as allowing a user to adjust the continuous position tailgate pad 400 according to the size of the truck. For example, only one section of continuous position tailgate pad 400 may be utilized in a small truck, or if the user only wants to have a portion of the tailgate 77 padded. Alternatively, if a user wants the entire tailgate to be padded or has a larger truck, they can use two or three sections of continuous position tailgate pad 400.

External pad 451 include a plurality of slats 481. In general, slats 481 are formed through at least a portion of the covering material and provide an attachment point for down tube straps 191 (such as shown in FIG. 2D). In one embodiment, the slats 481 are laser cut or die cut anchor slots. In one embodiment, the slats 481 are approximately 3 mm wide, approximately 32 mm long, and spaced approximately 30 mm apart. In one embodiment, the height and width of slats 481 is based on the size of the down tube straps 191. In one embodiment, the height and/or width of slats 481 will vary across the length of continuous position tailgate pad 400.

In one embodiment, the materials, operation, and performance of slats 481 are similar to those of slats 181 and as such, are not repeated for purposes of clarity, but are instead incorporated by reference in their entirety. For example, similar to slats 181, slats 481 are formed through at least a portion of the covering material of external pad 451 and provide size adjustable attachment points for the down tube straps 191.

In one embodiment, continuous position tailgate pad 400 is positioned with respect to tailgate 77 such that one or more of slats 481 are located on the top side of the tailgate 77 (e.g., on top side 106). In another embodiment, continuous position tailgate pad 400 is positioned with respect to tailgate 77 such that one or more of slats 481 are located on one or more of the back side, top side, and/or front side of tailgate 77. In general, the different positioning of slats 481 of continuous position tailgate pad 400 with respect to tailgate 77 provides different securing locations for different bicycle 50 down tube configurations.

Figure 5A:
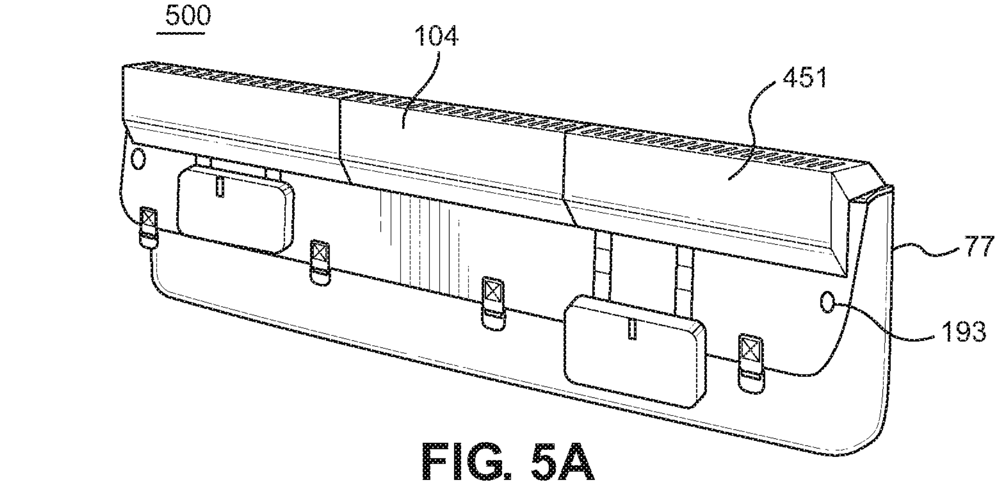
FIG. 5A is an off-center side perspective view of the top and rear of the continuous position tailgate pad mounted on a tailgate with the external pad in a deployed position, in accordance with an embodiment.

With reference now to FIG. 5A, an off-center side perspective view of the top and rear of the continuous position tailgate pad 400 mounted on tailgate 77 with external pad 451 in a deployed position 500 is shown in accordance with an embodiment.

When the external pad 451 is in its deployed position 500, continuous position tailgate pad 400 will provide foam padding all the way across the tailgate 77, and the row of slats 481 available for the installation and retention of down tube straps 191 across the entire length thereof. In so doing, a bicycle 50 is able to be secured anywhere along the tailgate 77, and the number of bikes that can be accommodated is limited by the width of the truck bed 87 rather than the number of discrete spaces a bike can be placed.

Moreover, because of the number of slats 481, bikes with various diameters of down tubes can be equally accommodated for, as the user may adjust the slats 481 through which each of the down tube straps 191 is installed.

In one embodiment, continuous position tailgate pad 400 includes a grommet 193 as described herein.

Figure 5B:
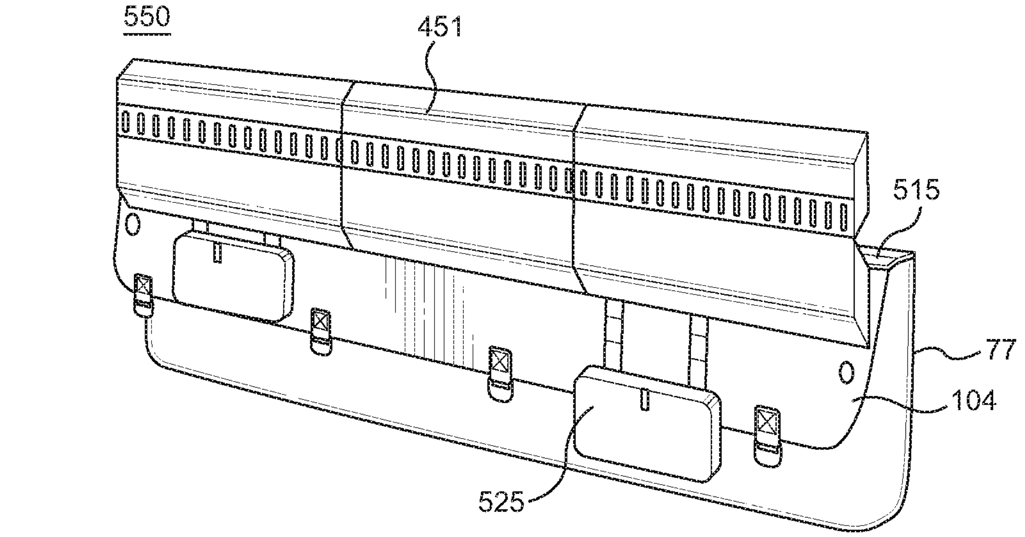
FIG. 5B is an off-center side perspective view of the top and rear of the continuous position tailgate pad mounted on a tailgate with the external pad in a partially deployed position, in accordance with an embodiment.
Figure 5C:
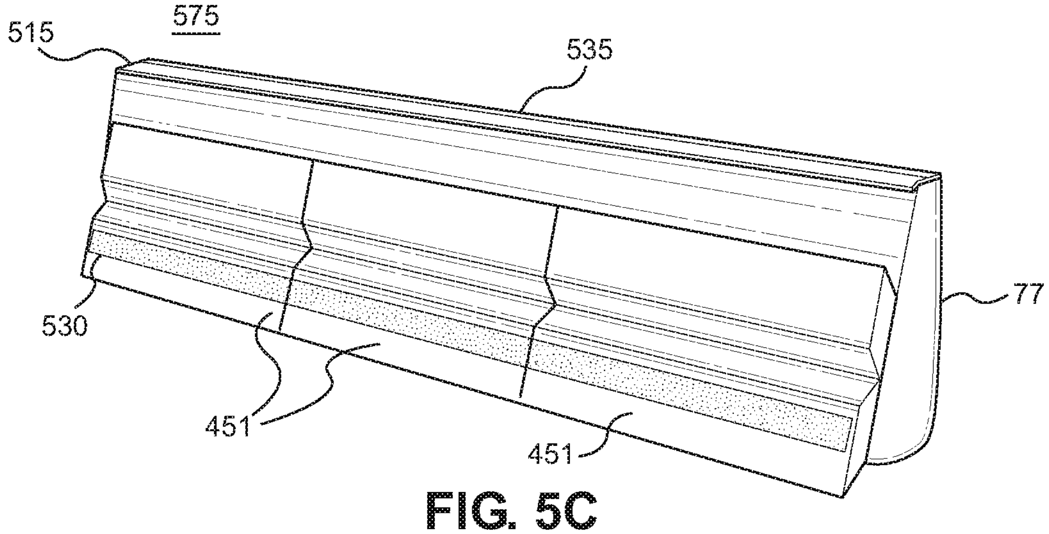
FIG. 5C is an off-center side perspective view of the top and rear of the continuous position tailgate pad mounted on a tailgate with the external pad in a stowed position, in accordance with an embodiment.

Referring now to FIG. 5B, an off-center side perspective view of the top and rear of the continuous position tailgate pad 400 mounted on tailgate 77 with external pad 451 in a partially deployed position 550 is shown in accordance with an embodiment. FIG. 5C is an off-center side perspective view of the top and rear of the continuous position tailgate pad 400 mounted on tailgate 77 with external pad 451 in a stowed position 575, shown in accordance with an embodiment.

With reference now to FIGS. 5B and 5C, in one embodiment, top side 406 of continuous position tailgate pad 400 includes a fastener 515, such as, a hook-and-loop fastener, a hook and eye fastener, snap fasteners, clips, magnetic fasteners, Block Tapey, and the like. Similarly, the tailgate facing side of external pad 451 includes fastener 530 that works in conjunction with fastener 515 to removably maintain the position of external pad 451 (or any of the sections thereof) when it is deployed.

In one embodiment, the length of fastener 515 is adjustable via a size adjuster 535. In one embodiment, size adjuster 535 is a hook. In one embodiment, size adjuster 535 is located under a flap of material in top side 406.

In one embodiment, the front side 402 of continuous position tailgate pad 400 includes a fastener such as fastener 515 and fastener 530 on the tailgate facing side of external pad 451 works in conjunction with front side fastener to removably maintain the position of external pad 451 (or any of the sections thereof) when it is deployed.

In one embodiment, top side 406 of continuous position tailgate pad 400 includes a fastener 515, front side 402 of continuous position tailgate pad 400 includes a fastener such as fastener 515, and the tailgate facing side of external pad 451 works in conjunction includes a plurality of fasteners 530 that work with both the top side fastener and the front side fastener to removably maintain the position of external pad 451 (or any of the sections thereof) when it is deployed. In one embodiment, continuous position tailgate pad 400 includes an accessory bag retainer 525.

Figure 6:
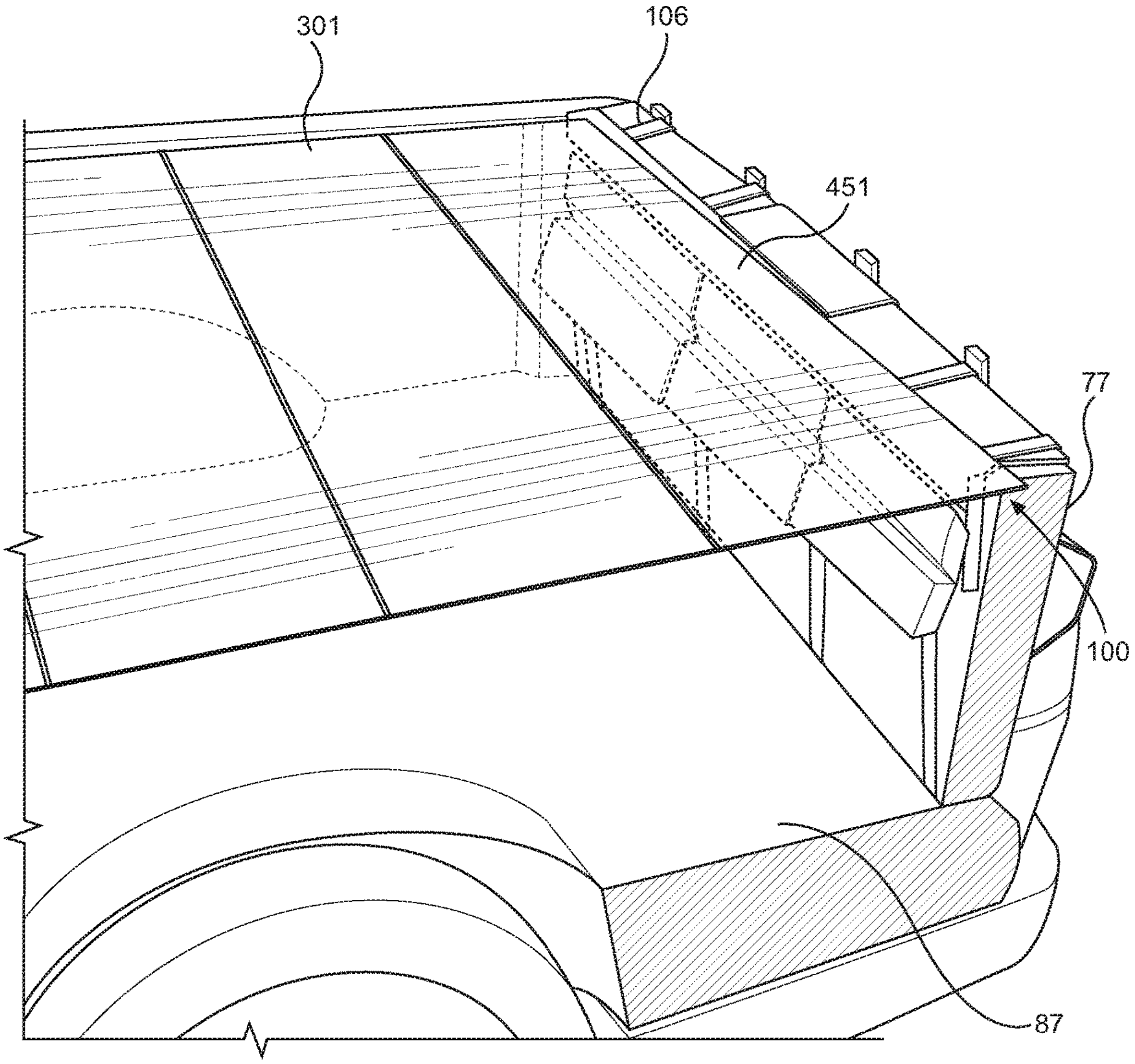
FIG. 6 is a back side perspective view of the continuous position tailgate pad installed on a tailgate with a closed bed cover, in accordance with one embodiment.

Referring now to FIG. 6, a back side perspective view of the continuous position tailgate pad 400 installed on tailgate 77 with a closed bed cover 301 is shown in accordance with one embodiment. As discussed herein, the bed cover 301 is designed to fit flush with the top of tailgate 77. As such, any significant padding or the like added to the top of tailgate 77 will directly impact the ability of the bed cover 301 to properly close. However, by providing reduced (or no) padding along the top side 406 of continuous position tailgate pad 400 and by allowing the external pad 451 to be stowed on the back side 404 (e.g., within the bed 87), the bed cover 301 can be properly closed while the continuous position tailgate pad 400 remains installed on tailgate 77.

In one embodiment, by providing reduced (or no) padding along the top side 406 of continuous position tailgate pad 400 and by allowing the external pad 451 to be stowed on the back side 404 (e.g., within the bed 87), another type of truck accessory, e.g., camper shell, etc. is also able to be properly installed and utilized while the continuous position tailgate pad 400 is installed on tailgate 77.

Figure 7A:
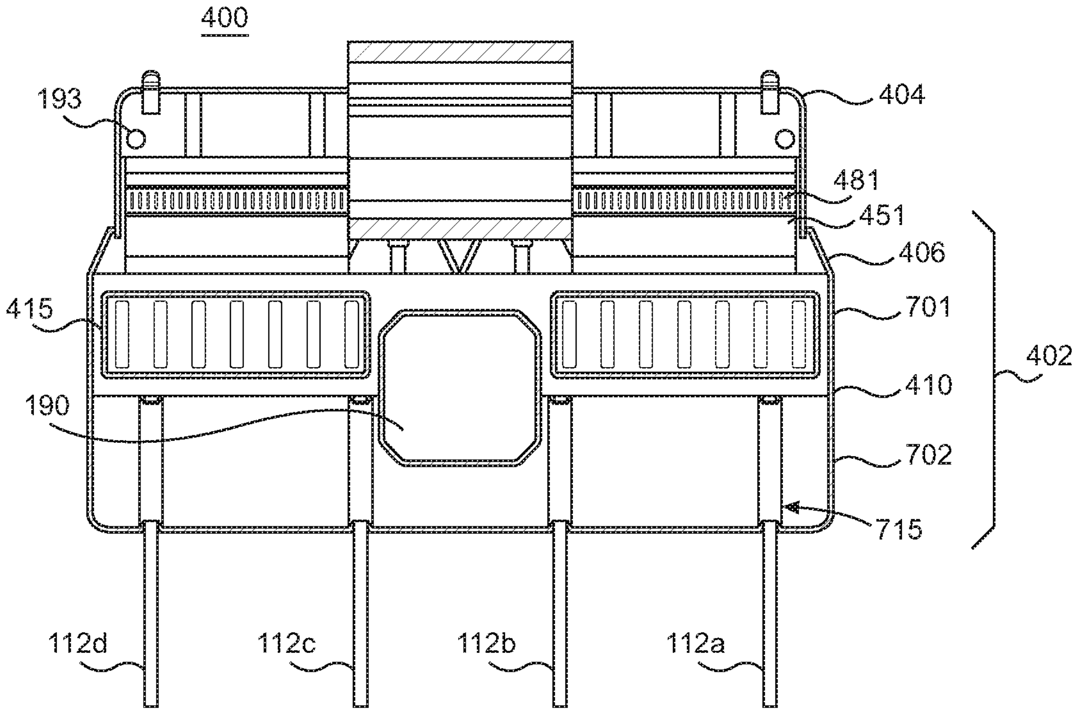
FIG. 7A is a front view of continuous position tailgate pad, in accordance with an embodiment.
Figure 7B:
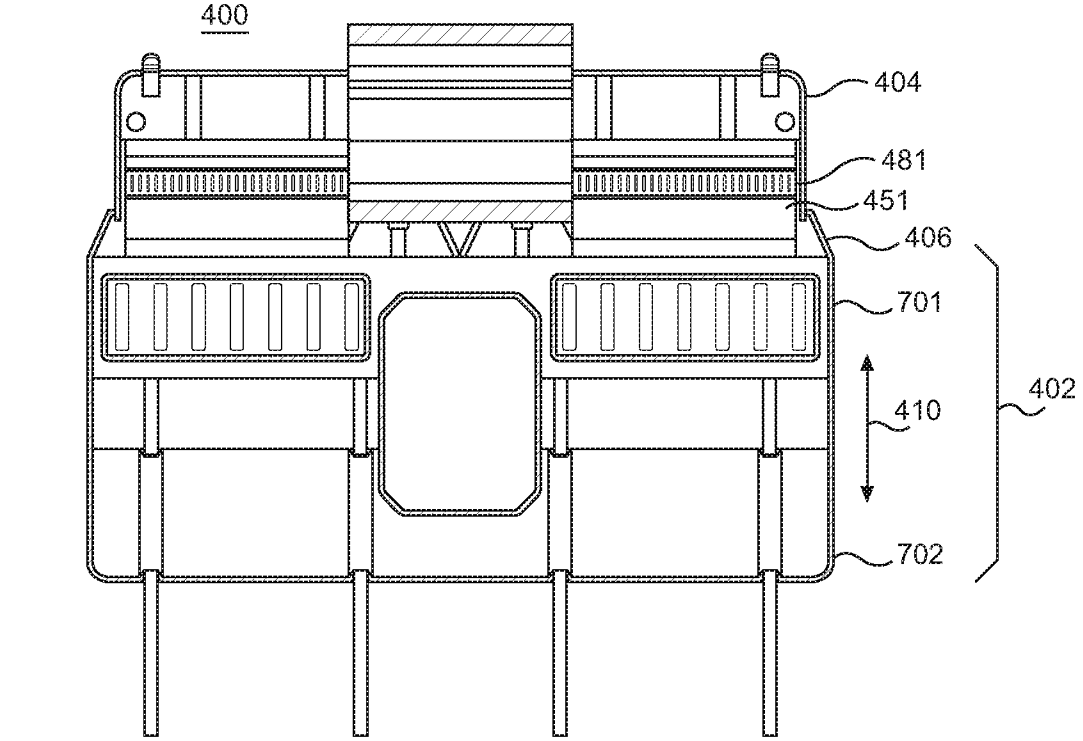
FIG. 7B is a front view of continuous position tailgate pad with the front side in an extended state, in accordance with an embodiment.

With reference now to FIG. 7A, a front view of continuous position tailgate pad 400 is shown in accordance with an embodiment. FIG. 7B, is a front view of continuous position tailgate pad 400 with front side 402 in an extended state, shown in accordance with an embodiment. In one embodiment, continuous position tailgate pad 400 includes front side 402, back side 404, top side 406, opening 190, straps 112*a*-112*d*, security component 193, and external pad 451 as described herein.

Referring now to FIGS. 7A and 7B, front side 402 of continuous position tailgate pad 400 has an adjustable range 410 to adjust the coverage size for the tailgate 77.

In one embodiment, front side 402 includes an upper panel 701 and a lower panel 702, where the lower panel 702 can move up or down with respect to the upper panel 701 to change the adjustable range 410. In one embodiment, tunnels 715 are formed in the lower panel 702 and the straps 112*a*-112*d* are routed therethrough. In one embodiment, tunnels 715 are frictionally coupled with straps 112*a*-112*d* such that the position of lower panel 702 is held by the friction between tunnels 715 and straps 112*a*-112*d* while it is being positioned.

Once the adjustable range 410 is set and the desired height of front side 402 is established, upper panel 701 and lower panel 702 are fixed in place when the fastening of straps 112*a*-112*d* with strap receiving features 115*a*-115*d* secure continuous position tailgate pad 400 with tailgate 77.

In one embodiment, a component such as, but not limited to, webbing, a strap, a portion of the material of the lower panel 702, an elongated portion of the material of the lower panel 702, or the like, will extend from the bottom of lower panel 702 under a bottom portion of the tailgate 77. This component will be pinched, held, tucked, or otherwise maintained by one or a combination of the securing of straps 112*a*-112*d* with strap receiving features 115*a*-115*d*, the tailgate 77 itself, and the like. As such, the lower panel 702, and the two-piece front side 402, will be appropriately spread out and retained with respect to tailgate 77 to prevent bunching, bulging, waving, wrinkling, billowing, or the like, thereof.

By providing a two-piece front side 402, continuous position tailgate pad 400 is able to fit about a front of tailgate 77 without creating unsightly bunching or bulging of either front side 402 or back side 404. As a result, continuous position tailgate pad 400 eliminates bunching and bulging of tailgate pad surfaces found in conventional ill-fitting tailgate pads.

Moreover, by providing an adjustable range 410 to the front side 402, continuous position tailgate pad 400 is able to achieve a proper fit about various tailgates of different, respective, heights and also for various bicycles with different front fork sizes, suspension lengths, etc. As a result, a single version of the continuous position tailgate pad 400 is able to be used with numerous tailgates and bicycles. As a result, continuous position tailgate pad 400 eliminates the requirement for a consumer to select a specific tailgate pad uniquely designed to match a particular tailgate size and/or bicycle 50 style. Further, by providing a continuous position tailgate pad 400 which can accommodate numerous tailgate dimension and/or bicycle sizes and/or configurations, consumer confusion is reduced, the need for complex vehicle-to-tailgate pad matching charts is eliminated, and the need for each tailgate to have a dedicated corresponding tailgate pad design is removed.

Rail and Bracket Assembly

Figure 8A:
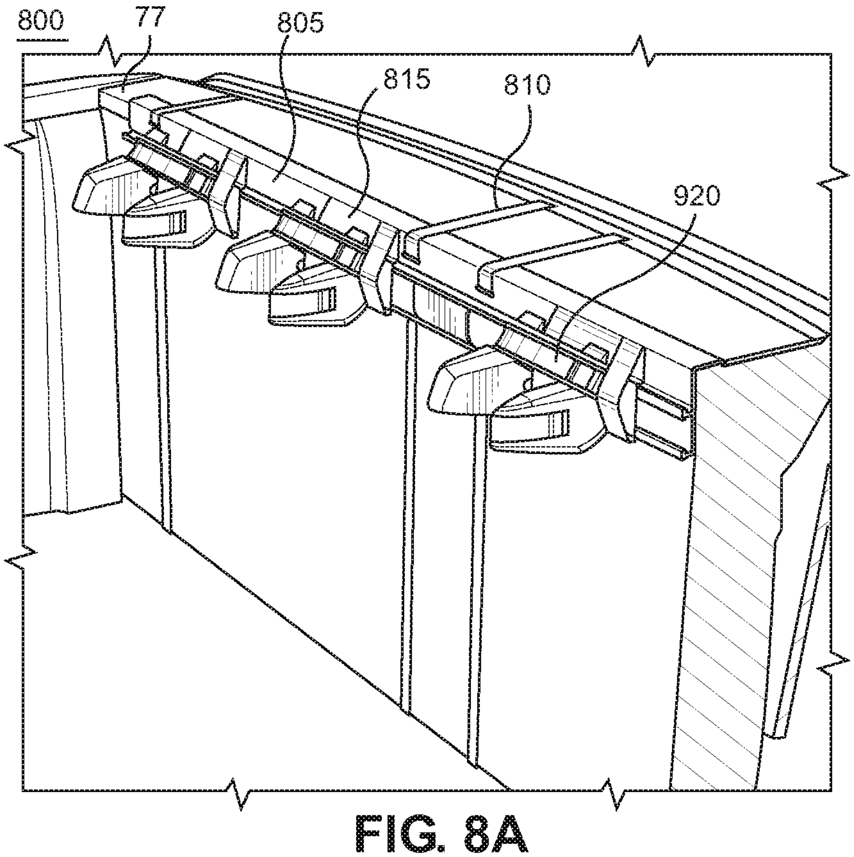
FIG. 8A is an off-center side perspective view of a rail and bracket assembly for use with a tailgate pad, in accordance with an embodiment.
Figure 8B:
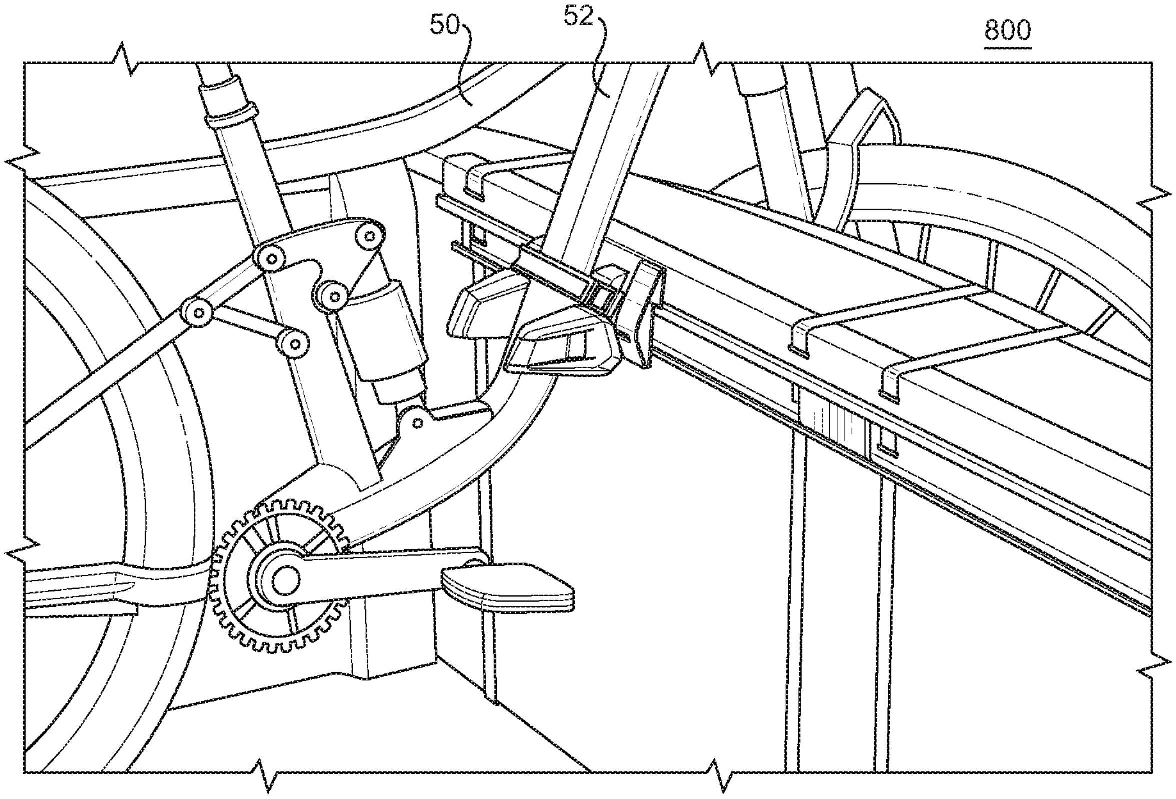
FIG. 8B is an off-center side perspective view of the rail and bracket assembly for use with a tailgate pad and retaining a bicycle, in accordance with an embodiment.

With reference now to FIG. 8A, an off-center side perspective view of a rail and bracket assembly 800 for use with a tailgate pad is shown in accordance with an embodiment. FIG. 8B is an off-center side perspective view of the rail and bracket assembly 800 for use with a tailgate pad and retaining a bicycle 50 is shown in accordance with an embodiment. In one embodiment, rail and bracket assembly 800 can be used in conjunction with discrete positioning tailgate pad 100 and/or continuous position tailgate pad 400.

Referring now to FIGS. 8A and 8B, in one embodiment discrete positioning tailgate pad 100 is installed on tailgate 77 and the one or more external pads 151*a*-151*f* are either stowed or removed. Similarly, discrete positioning tailgate pad 400 is installed on tailgate 77 and external pad 451 is either stowed or removed. The following discussion will utilize discrete positioning tailgate pad 100 as the exemplary tailgate pad for purposes of clarity.

In one embodiment, discrete positioning tailgate pad 100 includes the front side 102, back side 104, and top side 106. In one embodiment, one, some, or all of front side 102, back side 104, and top side 106 include a tailgate-facing surface and an exterior-facing surface. In the following discussion, the description of the components of FIGS. 8A and 8B that are similar to those described in FIGS. 1-3B may not be repeated for purposes of clarity but are incorporated herein by reference in their entirety.

In general, instead of utilizing the one or more external pads 151*a*-151*f* and the associated down tube straps 191 to position and hold a bicycle 50, rail and bracket assembly 800 is attached to the tailgate 77 and used to position and hold the down tube 52 of bicycle 50.

In one embodiment, rail and bracket assembly 800 is a bracket on rails system. In another embodiment, rail and bracket assembly 800 is a cooperative bracket system. In one embodiment, rail and bracket assembly 800 includes a rail 805, a plurality of straps 810, and at least one bracket 815. In one embodiment, straps 810 are used to couple the rail 805 of rail and bracket assembly 800 with tailgate 77. In one embodiment, rail 805 is coupled with tailgate 77 around the outside of discrete positioning tailgate pad 100 which is also coupled with tailgate 77.

Bracket 815 is added to the rail 805 and is used to secure a bicycle 50 to the tailgate 77. In one embodiment, the bracket 815 can move along the range of rail 805, thereby allowing the user to locate bicycle 50 anywhere along the tailgate 77. Once installed in the desired location on rail 805, bracket 815 is locked into position on the rail 805 to prevent horizontal movement thereof. In so doing, a user does not have to compromise on the location of bicycle 50 or be limited by the number of available slots through which a down tube strap 191 could be run.

By providing a solid, unmoving connection, when bicycle 50 is coupled with the bracket 815, abrasion or motion related damage to either or both of the bicycle 50 and tailgate 77 is reduced.

Figure 9:
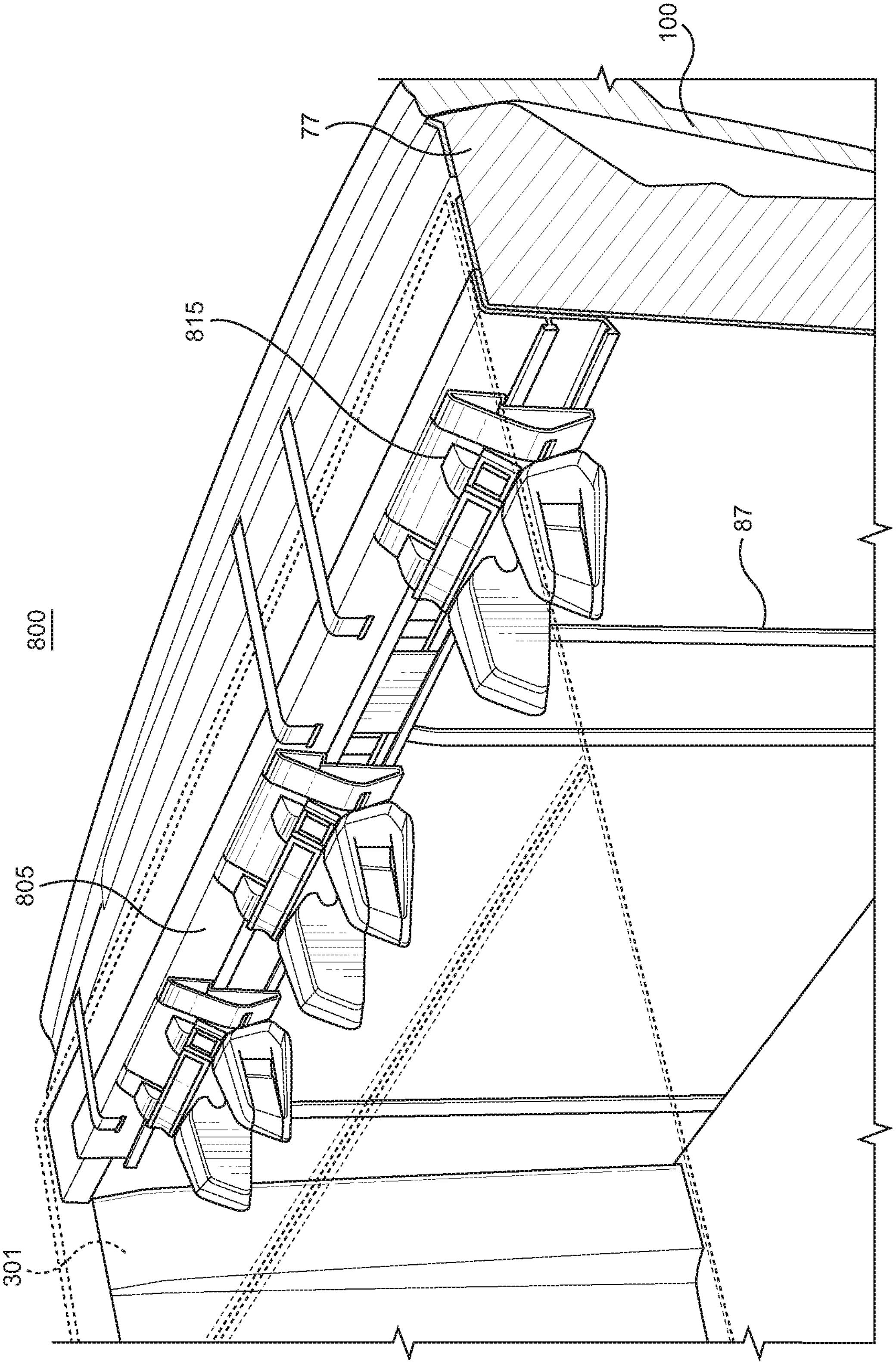
FIG. 9 is a back side perspective view of the rail and bracket assembly installed on a tailgate with a closed bed cover, in accordance with one embodiment.

With reference now to FIG. 9, a back side perspective view of the rail and bracket assembly 800 installed on tailgate 77 with a closed bed cover 301 is shown in accordance with one embodiment. As discussed herein, the bed cover 301 is designed to fit flush with the top of tailgate 77. As such, any significant padding, features, or the like added to the top of tailgate 77 will directly impact the ability of the bed cover 301 to properly close. However, by providing reduced (or no) padding along the top side 406 and by having the top of bracket 815 installed lower than the top of the tailgate (e.g., within the bed 87), the bed cover 301 (or another type of truck accessory such as a camper shell, etc.) can be properly closed while the rail and bracket assembly 800 remains installed on tailgate 77.

Figure 10A:
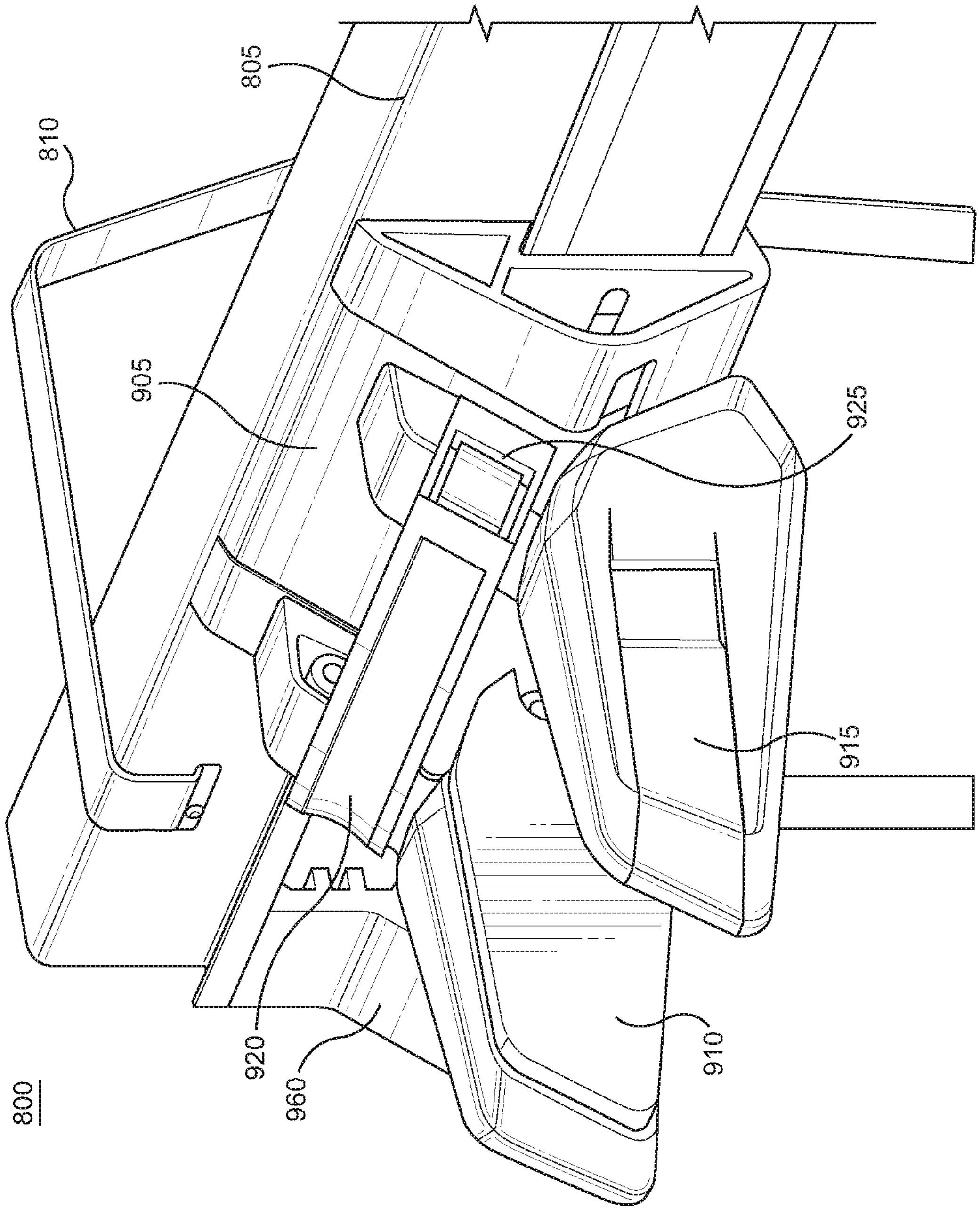
FIG. 10A is a perspective view of a bracket installed on a rail, in accordance with an embodiment.

Referring now to FIG. 10A, a perspective view of a bracket 815 installed on rail 805 is shown in accordance with an embodiment. In one embodiment, bracket 815 includes a down tube pad 905, security feature 960, frame pads 910, rail clamp release lever 915, down tube strap 920, and down tube strap handle 925.

Down tube pad 905 is located within the bracket 815 at a location on which a down tube of a bicycle 50 would rest. The down tube pad 905 is used to cushion the down tube and also prevent damage. Down tube strap 920 is used to secure the down tube to the bracket 815 (similar to down tube straps 191 described herein).

In one embodiment, a different sized bracket 815 is used to accommodate different bicycles with down tubes of different thicknesses. In one embodiment, a different sized down tube pad 905 is used with bracket 815 to accommodate different bicycles with down tubes of different thicknesses.

Figure 10B:
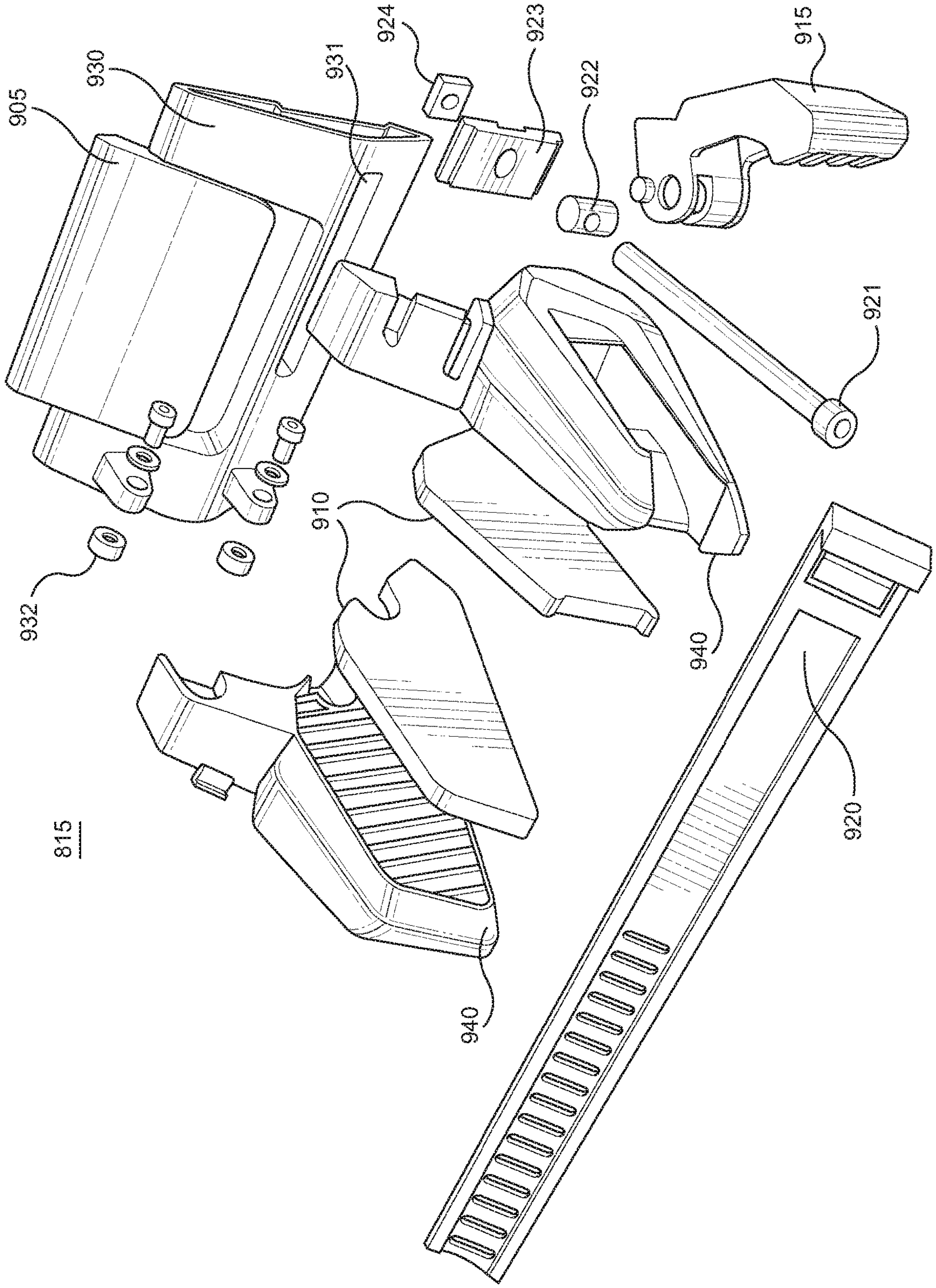
FIG. 10B is an exploded view of an adjustable bracket, in accordance with an embodiment.

With reference now to FIG. 10B, an exploded view of an adjustable bracket 815 is shown in accordance with an embodiment. Bracket 815 includes a back slider 930, down tube pad 905, arms 940, frame pads 910, down tube strap 920, and lever 915.

In one embodiment, back slider 930 and arms 940 are glass filled nylon. In another embodiment, back slider 930 and/or arms 940 are made of a material such as, but not limited to, aluminum, stainless steel, composite, or the like.

With reference now to FIGS. 10A and 10B, in one embodiment, arms 940 are cooperatively adjustable. That is, the width between arms 940 can be adjusted allowing the bracket 815 to properly fit multiple different sizes of down tubes.

For example, one of the arms 940 (e.g., the left arm) is installed at a fixed location on back slider 930 and held in position by fastener 932. The other of the arms 940 (e.g., the right arm) is installed within slot 931 of back slider 930 such that the location of the right arm can be adjusted within the slot 931 to accommodate for varying diameters of down tubes.

In one embodiment, the adjustment is achieved by the left arm having a horizontally extending piece to which the right arm couples. In one embodiment, the horizontally extending piece is the defining length of the arm. In one embodiment, the horizontally extending piece has a stop, detent, tab, lip, etc., on the end to prevent the right arm from being decoupled.

In one embodiment, the right arm clamps over both the horizontally extending piece and the rail 805 on which the cooperative bracket 815 slides. In one embodiment, the cam lever includes lever 915, screw 921, dowl 922, pull plate 923, and nut 924.

In one embodiment, the right arm includes the cam lever with at least two positions. In one embodiment, a first position of the cam lever will lock the horizontally extending piece, and in turn the left arm, in place to fix the width of the cooperative bracket 815. A second position of the cam lever will fix the position of the cooperative bracket 815 relative to the rail 805. Another cam lever position will allow for the free movement of both arms 940. In one embodiment, the left arm may be fully removed from the right arm, the back slider 930 and the rail 805 if the cam lever is not in a position that clamps down on the horizontally extending piece.

Figure 10C:
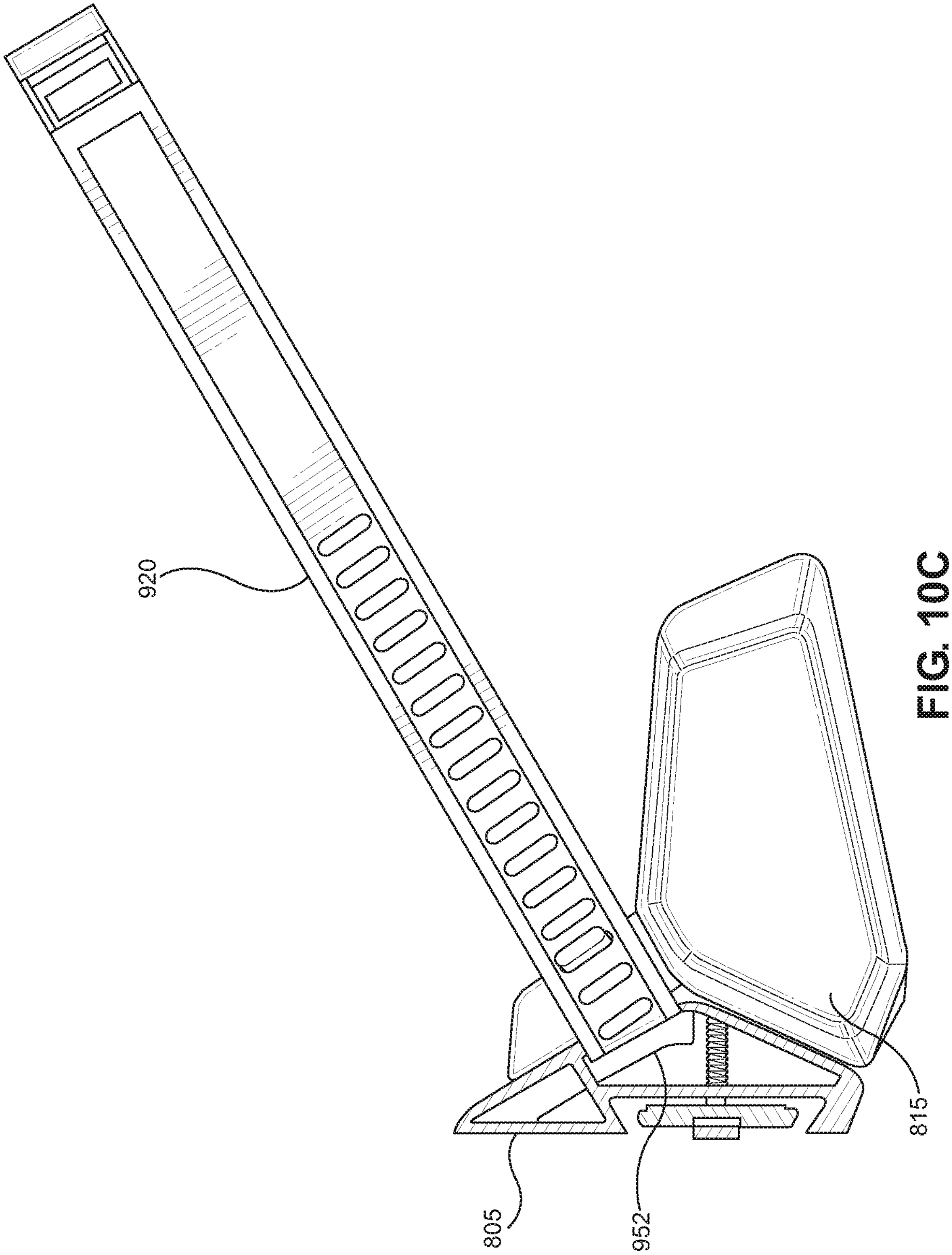
FIG. 10C is a side view of a cooperative bracket coupled with a rail, in accordance with an embodiment.

With reference now to FIG. 10C, a side view of cooperative bracket 815 coupled with rail 805 is shown in accordance with an embodiment. Bracket 815 includes an internal tunnel 952 between the rail 805 and the back of bracket 815 that is available to receive any extra length of strap 920.

In one embodiment, strap 920 is a flexible material (such as rubber or the like) and has one side fixedly coupled with back slider 930. The remining length of strap 920 includes one or more holes for a snap fit securement, so the length may be adjusted for different down tube diameters.

Figure 11A:
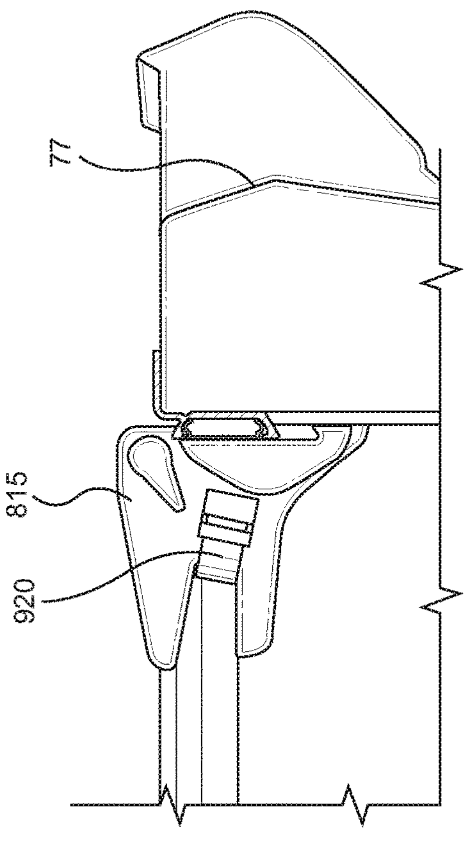
FIG. 11A is a side view of a bracket coupled with a rail in an upward position, in accordance with an embodiment.
Figure 11B:
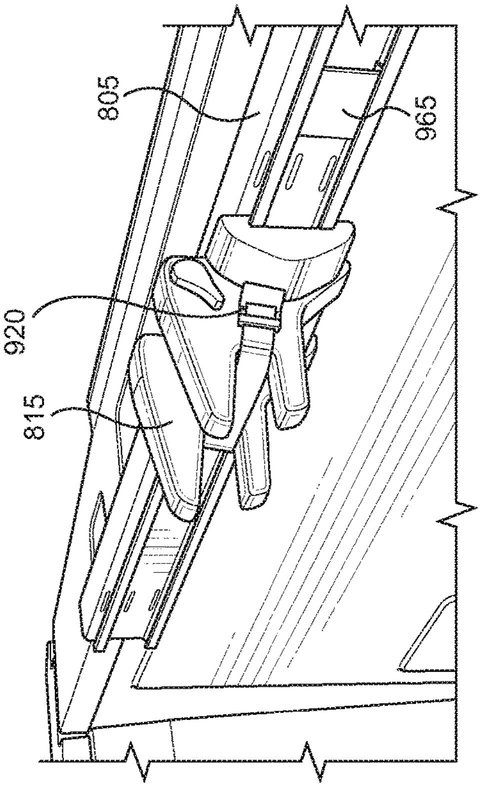
FIG. 11B is a perspective view of the bracket coupled with the rail in the upward position of FIG. 11A, in accordance with an embodiment.

With reference now to FIG. 11A, a side view of bracket 815 coupled with rail 805 in an upward position is shown in accordance with an embodiment. FIG. 11B is a perspective view of the bracket 815 coupled with rail 805 in the upward position of FIG. 11A, in accordance with an embodiment.

Figure 11C:
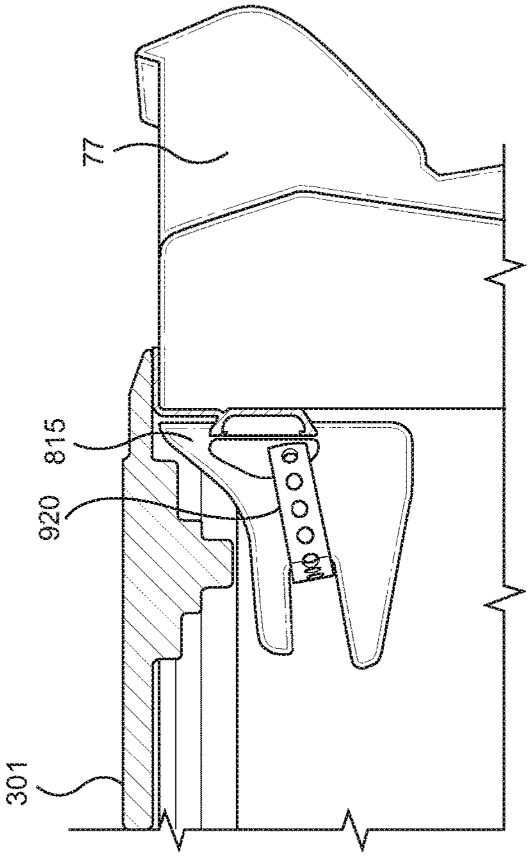
FIG. 11C is a side view of the bracket coupled with a rail in a downward position, in accordance with an embodiment.
Figure 11D:
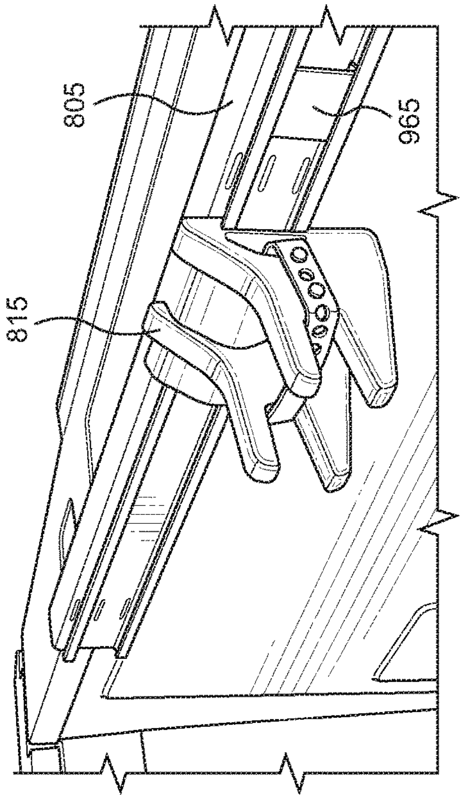
FIG. 11D is a perspective view of the bracket coupled with the rail in the downward position of FIG. 11C, in accordance with an embodiment.

FIG. 11C is a side view of bracket 815 coupled with rail 805 in a downward position, in accordance with an embodiment. FIG. 11D is a perspective view of the bracket 815 coupled with rail 805 in the downward position of FIG. 11C, in accordance with an embodiment.

In general, FIGS. 11A and 11B show bracket 815 coupled with the rail 805 and extending above the top plane of tailgate 77. In one embodiment, this upward orientation is preferred when a bicycle 50 is held therein. For example, the upward position will provide more stability as the bracket 815 can more fully straddle the down tube of bicycle 50 and are also located farther up the rotational axis of bicycle 50.

However, when the bicycle 50 is not held by bracket 815, and/or the user wants to close bed cover 301 while still being able to utilize the rail and bracket assembly 800, the bracket 815 is rotated 180 degrees and installed in the downward orientation as shown in FIGS. 11C and 11D. In so doing, the rail and bracket assembly 800 can remain installed on tailgate 77 along with the discrete positioning tailgate pad 100 while the bed accessory is able to be properly utilized.

In one embodiment, FIGS. 11A-11D also illustrate an adjustable strap 920 with one end having a buckle and the other a snap fit.

Figure 12B:
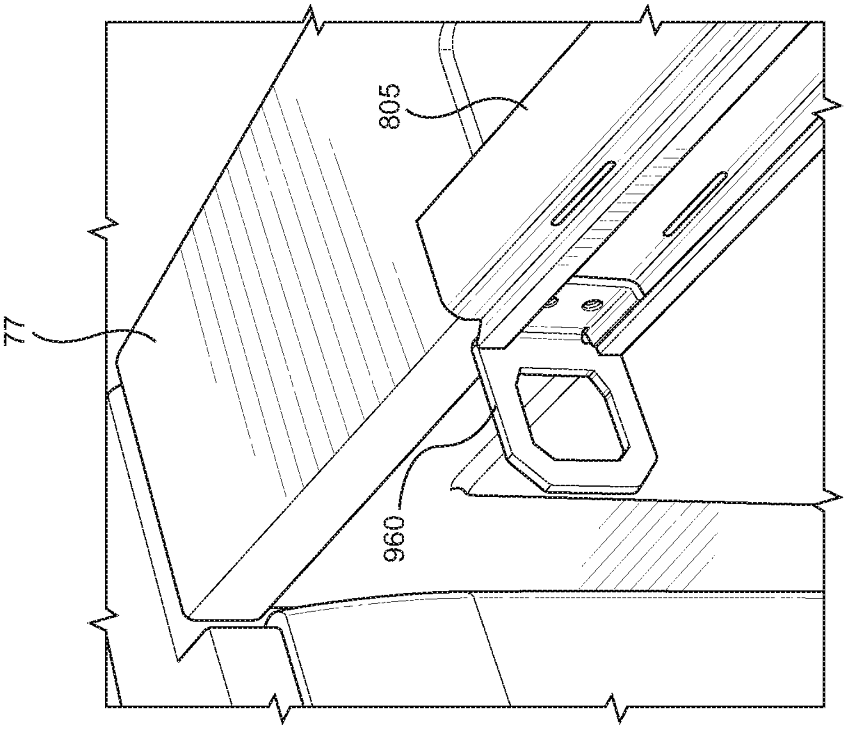
FIG. 12B is a perspective view of a security feature with a different orientation installed on a rail, in accordance with an embodiment.
Figure 12A:
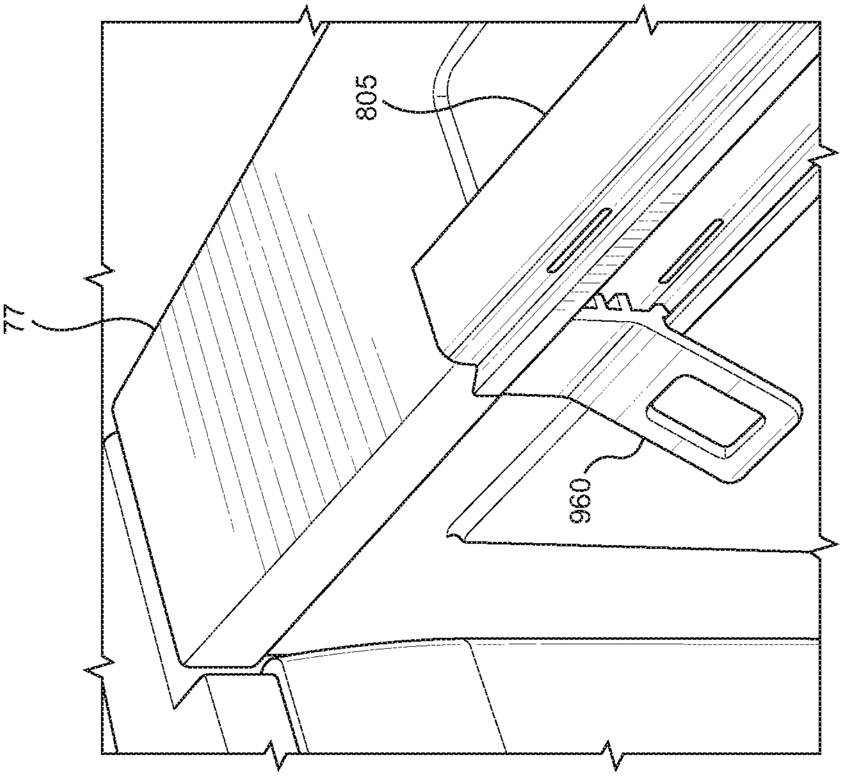
FIG. 12A is a perspective view of a security feature installed on a rail, in accordance with an embodiment.

Referring now to FIG. 12A, a perspective view of a security feature 960 installed on rail 805 is shown in accordance with an embodiment. FIG. 12B is a perspective view of a security feature 960 with a different orientation installed on rail 805, in accordance with an embodiment.

With reference to FIGS. 12A and 12B, the security feature 960 is used to provide security for rail and bracket assembly 800 similar to the security component 193. For example, security feature 960 allow a user to secure the rail 805 to the truck bed for security purposes. In one embodiment, similar to the security component 193 discussion, a cable, lock, or the like is coupled with security feature 960 and a portion of the vehicle 81 to secure the rail 805 to the vehicle 81 and prevent theft thereof.

In one embodiment, as shown in FIG. 12B, security feature 960 is screwed to (or otherwise fixedly coupled with) the rail 805. The screws are installed from the side of the rail 805 that is pressed against the tailgate 77 while in use, to prevent a third party from simply unscrewing the security feature 960. In one embodiment, the security feature 960 is installed prior to attaching the rail 805 to the tailgate 77. In one embodiment, there are discrete positions along rail 805 where the security feature 960 is able to be installed.

In one embodiment, as shown in FIG. 12A, security feature 960 has a variable position capability. In one embodiment, there is a track within rail 805 through which the variable location security feature 960 may travel. In one embodiment, the installation of security feature 960 into the track is done from the side of the rail 805 that is against the tailgate 77 while the rail 805 is in use. In one embodiment, the security feature 960 includes a cam to lock the position, and an end cap is placed on the end of the rail 805 to prevent the removal of the security feature 960. In one embodiment, the end cap may be removed with a specialized tool, require a key or code to remove, or include another security feature to prevent a third party from simply removing the end cap and the security feature 960.

Figure 13B:
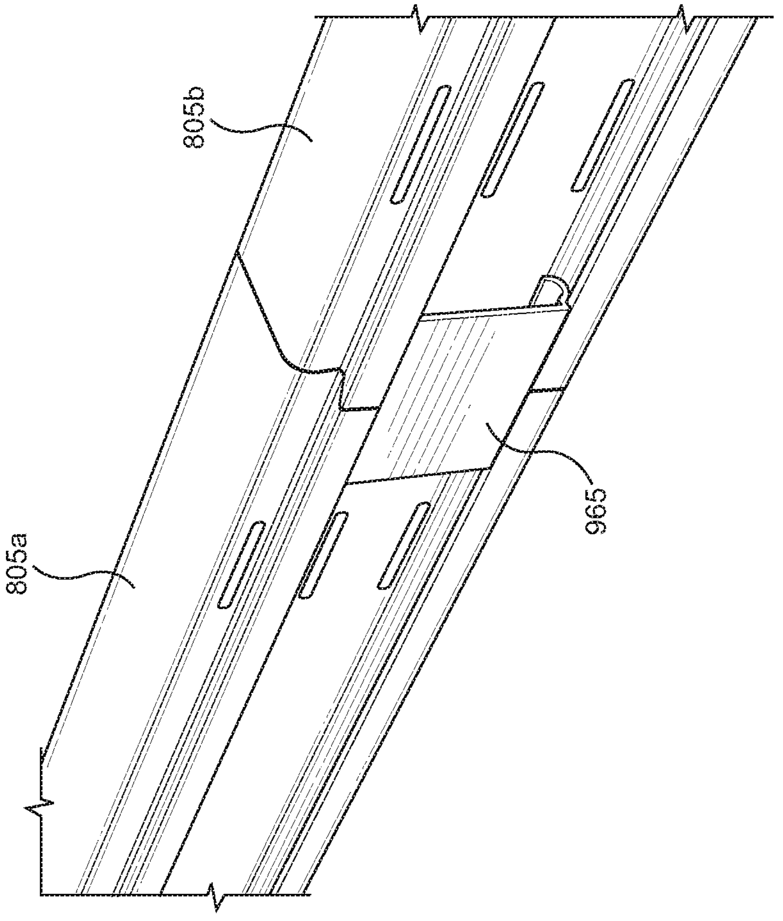
FIG. 13B is a perspective view of two rails connected by a connector, in accordance with an embodiment.
Figure 13A:
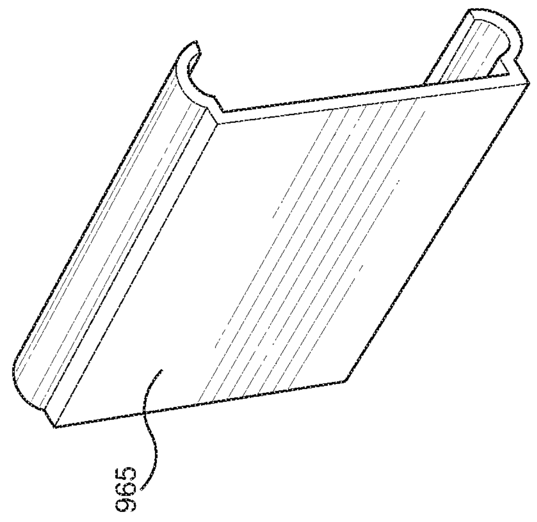
FIG. 13A is a perspective view of a connector, in accordance with an embodiment.

With reference now to FIG. 13A, a perspective view of a connector 965 is shown in accordance with an embodiment. FIG. 13B is a perspective view of two rails connected by connector 965 in accordance with an embodiment.

With reference now to FIGS. 13A and 13B, in one embodiment, the rail and bracket assembly 800 can have two or more rails 805*a* and 805*b* instead of a single rail 805. The multiple rail segment capability would allow for a more universal fitment of rail 805 within the size confines of different tailgates 77. A multiple rail configuration will also have an advantage when it comes to shipping, storage, and installation.

In one embodiment, connector 965 (or retaining feature, locking feature, etc.) is used to couple the two or more rails

805*a* and 805*b* together. In one embodiment, connector 965 is press fit into a first rail 805*a*, and couples with second rail 805*b*.

The foregoing Description of Embodiments is not intended to be exhaustive or to limit the embodiments to the precise form described. Instead, the examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

We claim:

1. A discrete positioning tailgate pad comprising:

a front side comprising at least one external pad retainer;

a top side; and a back side comprising at least one external pad disposed therewith, said at least one external pad comprising:

a deployed position, said deployed position configured to extend from said back side, over said top side, and couple with said at least one external pad retainer on said front side to provide a padded structure for a portion of a bicycle resting thereon; and a stowed position, said stowed position configured to not traverse said top side.

2. The discrete positioning tailgate pad of claim 1, wherein said at least one external pad comprises:

a cover material;

a pad disposed within said cover material; and a plurality of slats configured to provide an adjustable attachment location for a down tube strap.

3. The discrete positioning tailgate pad of claim 1, wherein said at least one external pad is fixedly coupled with said back side of said discrete positioning tailgate pad.

4. The discrete positioning tailgate pad of claim 1, wherein said at least one external pad is removably coupled with said back side of said discrete positioning tailgate pad.

5. The discrete positioning tailgate pad of claim 1, further comprising:

a plurality of retaining straps coupled with said back side of said discrete positioning tailgate pad; and a plurality of strap receiving features coupled with said front side of said discrete positioning tailgate pad.

6. The discrete positioning tailgate pad of claim 1, further comprising:

a plurality of retaining straps coupled with said front side of said discrete positioning tailgate pad; and a plurality of strap receiving features coupled with said back side of said discrete positioning tailgate pad.

7. The discrete positioning tailgate pad of claim 1, further comprising:

a security component formed therein, said security component configured to receive an anti-theft lock to securely couple said discrete positioning tailgate pad with a vehicle on which it is deployed.

8. The discrete positioning tailgate pad of claim 1, further comprising:

an opening through said front side, said opening configured to provide access to a feature located on a tailgate and otherwise covered by said discrete positioning tailgate pad.

9. The discrete positioning tailgate pad of claim 1, wherein said top side comprises no padding therein, such that a bed cover of a vehicle is capable of being properly closed while said discrete positioning tailgate pad is installed on a tailgate of said vehicle.

10. A continuous position tailgate pad comprising:

a front side;

a top side; and a back side comprising an external pad coupled therewith, said external pad comprising:

a deployed position, said deployed position configured to extend from said back side, over said top side, and in front of said front side to provide a padded structure for a portion of a bicycle resting thereon; and a stowed position, said stowed position configured to not traverse said top side.

11. The continuous position tailgate pad of claim 10, wherein said external pad comprises:

a cover material;

a pad disposed within said cover material; and a plurality of slats configured to provide an adjustable attachment location for a down tube strap.

12. The continuous position tailgate pad of claim 10, wherein said external pad is fixedly coupled with said back side of said continuous position tailgate pad.

13. The continuous position tailgate pad of claim 10, wherein said external pad is removably coupled with said back side of said continuous position tailgate pad.

14. The continuous position tailgate pad of claim 10, wherein said external pad covers an entire length of said top side of said continuous position tailgate pad.

15. The continuous position tailgate pad of claim 10, further comprising:

a first portion of a fastener coupled with said top side of said continuous position tailgate pad; and a second portion of said fastener coupled with a tailgate facing side of said external pad, said second portion of said fastener to removably fasten with said first portion of said fastener to maintain a position of said external pad with respect to said top side of said continuous position tailgate pad.

16. The continuous position tailgate pad of claim 10, further comprising:

a first portion of a fastener coupled with said front side of said continuous position tailgate pad; and a second portion of said fastener coupled with a tailgate facing side of said external pad, said second portion of said fastener to removably fasten with said first portion of said fastener to maintain a position of said external pad with respect to said front side of said continuous position tailgate pad.

17. The continuous position tailgate pad of claim 10, further comprising:

a fork retention pad coupled with said front side of said continuous position tailgate pad.

18. The continuous position tailgate pad of claim 10, wherein said front side comprises:

an upper panel; and a lower panel; and an adjustable range, wherein said lower panel is moved with respect to said upper panel to modify said adjustable range.

19. The continuous position tailgate pad of claim 18, further comprising:

a plurality of tunnels formed in said lower panel; and a plurality of straps, wherein each of said plurality of straps are routed through a tunnel of said plurality of tunnels to maintain a position of said lower panel with respect to said upper panel.

20. The continuous position tailgate pad of claim 10, wherein said top side comprises no padding therein, such that a bed accessory of a vehicle is capable of being utilized while said continuous position tailgate pad is installed on a tailgate of said vehicle.

21. The continuous position tailgate pad of claim 10, further comprising:

a security component formed therein, said security component configured to receive an anti-theft lock to securely couple said continuous position tailgate pad with a vehicle on which it is deployed.

22. The continuous position tailgate pad of claim 10, further comprising:

an opening through said front side, said opening configured to provide access to a feature located on a tailgate and otherwise covered by said continuous position tailgate pad.

23. A rail and bracket assembly hybrid tailgate pad comprising:

a tailgate pad comprising:

a front side; and a top side, said tailgate pad is configured to couple with a tailgate;

a rail is configured to couple with a back side of said tailgate; and a bracket movably coupled with said rail, said bracket configured to secure a down tube of a bicycle.

24. The rail and bracket assembly hybrid tailgate pad of claim 23, further comprising:

at least one strap configured to removably couple said rail with said tailgate.

25. The rail and bracket assembly hybrid tailgate pad of claim 23, wherein said bracket is configured to be locked into a position with respect to said rail when a location of said bracket with respect to said rail is established.

26. The rail and bracket assembly hybrid tailgate pad of claim 23, further comprising:

a plurality of brackets movably coupled with said rail.

27. The rail and bracket assembly hybrid tailgate pad of claim 23, wherein a top of said rail and a top of said bracket are located below a top of said tailgate, such that a bed accessory of a vehicle is capable of being utilized while said rail and said bracket are installed on said tailgate.

28. The rail and bracket assembly hybrid tailgate pad of claim 23, further comprising:

a security feature coupled with said rail, said security feature configured to receive an anti-theft lock to securely couple said rail with a vehicle on which it is deployed.

29. The rail and bracket assembly hybrid tailgate pad of claim 23, wherein said bracket comprises:

a back slider;

a first arm coupled at a fixed location with said back slider; and a second arm coupled with a slot of said back slider, such that a location of said second arm is adjustable with respect to said first arm to accommodate a varying diameter of a plurality of different down tubes.

30. The rail and bracket assembly hybrid tailgate pad of claim 23, further comprising:

two or more rails; and a connector to couple the two or more rails, said connector press fit within said two or more rails.

* * * * *